(12) United States Patent
Miyazaki et al.

(10) Patent No.: US 8,939,594 B2
(45) Date of Patent: Jan. 27, 2015

(54) DISPLAY DEVICE AND BACKLIGHT FOR DISPLAY DEVICE

(75) Inventors: Takashi Miyazaki, Kanagawa-ken (JP); Hitoshi Nagato, Tokyo (JP); Hajime Yamaguchi, Kanagawa-ken (JP); Rei Hasegawa, Kanagawa-ken (JP); Yutaka Nakai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/491,065

(22) Filed: Jun. 7, 2012

(65) Prior Publication Data

US 2013/0070482 A1 Mar. 21, 2013

(30) Foreign Application Priority Data

Sep. 20, 2011 (JP) ................................. 2011-204528

(51) Int. Cl.
*G09F 13/04* (2006.01)
*F21V 8/00* (2006.01)
*G02F 1/1335* (2006.01)

(52) U.S. Cl.
CPC .............. *G02B 6/0038* (2013.01); *G02B 6/002* (2013.01); *G02B 6/0055* (2013.01); *G02F 1/133615* (2013.01)
USPC ........................... 362/97.1; 362/624; 362/627

(58) Field of Classification Search
USPC ........................ 362/97.1, 602, 615, 624, 627
See application file for complete search history.

(56) References Cited

U.S. PATENT DOCUMENTS

2001/0010630 A1    8/2001    Umemoto

FOREIGN PATENT DOCUMENTS

| CN | 101743433 A | 6/2010 |
|---|---|---|
| JP | 7-72478 | 3/1995 |
| JP | 2001-194534 A | 7/2001 |
| JP | 2003-107441 | 4/2003 |
| JP | 2004-184791 A | 7/2004 |
| JP | 3115861 U | 11/2005 |
| JP | 2006-349768 | 12/2006 |
| JP | 2007-240668 | 9/2007 |
| KR | 10-0436104 | 6/2004 |
| WO | WO 2009/093452 A1 | 7/2009 |

OTHER PUBLICATIONS

U.S. Appl. No. 13/718,601, filed Dec. 18, 2012, Nagato, et al.

(Continued)

*Primary Examiner* — Diane Lee
*Assistant Examiner* — Meghan Dunwiddie
(74) *Attorney, Agent, or Firm* — Oblon, Spivak, McClelland, Maier & Neustadt, L.L.P.

(57) ABSTRACT

According to one embodiment, a display device includes a light-guiding body, a light source, a wavelength selection transmission layer, and a light control layer. The light-guiding body has a first major surface, a second major surface opposite to the first major surface, and a side face connecting the first major surface and the second major surface. The wavelength selection transmission layer is provided on the second major surface. The first major surface has a plurality of concave portions having inclined faces inclined relative to the first major surface. A ratio of a total area of the plurality of the concave portions projected on the first major surface, relative to an area of the first major surface is 8% to 25%. The plurality of the concave portions is evenly provided in the first major surface.

21 Claims, 12 Drawing Sheets

(56) References Cited

OTHER PUBLICATIONS

Office action issued Aug. 12, 2013 in Korean Application No. 10-2012-70884 (With English Translation).

Ali Hussain Ali, "Electrochemically Induced Shifts in the Plasmon Resonance Bands of Nanoscopic Gold Particles Adsorbed on Transparent Electrodes", Journal of the Electrochemical Society, vol. 146 (2), 1999, 9 pages.

Office Action issued Feb. 7, 2014 in Japanese Patent Application No. 2011-204528 with English language translation.

Office Action issued Aug. 28, 2014 in Japanese Patent Application No. 2011-204528 (with English Translation).

Office Action issued Nov. 3, 2014, in Chinese Patent Application No. 201210216769.8, (with English-language Translation).

DISPLAY DEVICE AND BACKLIGHT FOR DISPLAY DEVICE

CROSS-REFERENCE TO RELATED APPLICATIONS

This application is based upon and claims the benefit of priority from the prior Japanese Patent Application No.2011-204528, filed on Sep. 20, 2011; the entire contents of which are incorporated herein by reference.

FIELD

Embodiments described herein relate generally to a display device and a backlight for display device.

BACKGROUND

For example, there are cases where in portable devices such as notebook computers and smartphones, a battery is used as a power source. Therefore, it is desirable to achieve low power consumption.

In addition, there are cases where, for example, liquid crystal display devices in which a liquid crystal layer is provided between two substrates are used as display devices of such portable devices. In liquid crystal display devices, color display is performed by providing blue, green, and red color filters in each of a plurality of pixels. If an attempt to obtain high color reproduction is made by using a color filter absorbing light having a specific wavelength as the color filter, the utilization efficiency of light is reduced by the absorption of light by the color filter, and thus the display becomes darker.

In such liquid crystal display devices, in order to realize, at low power consumption, color display in which the color is beautiful, the display is bright, and the contrast is favorable, it is desirable to enhance the utilization efficiency of light.

DETAILED DESCRIPTION

Figure 1:
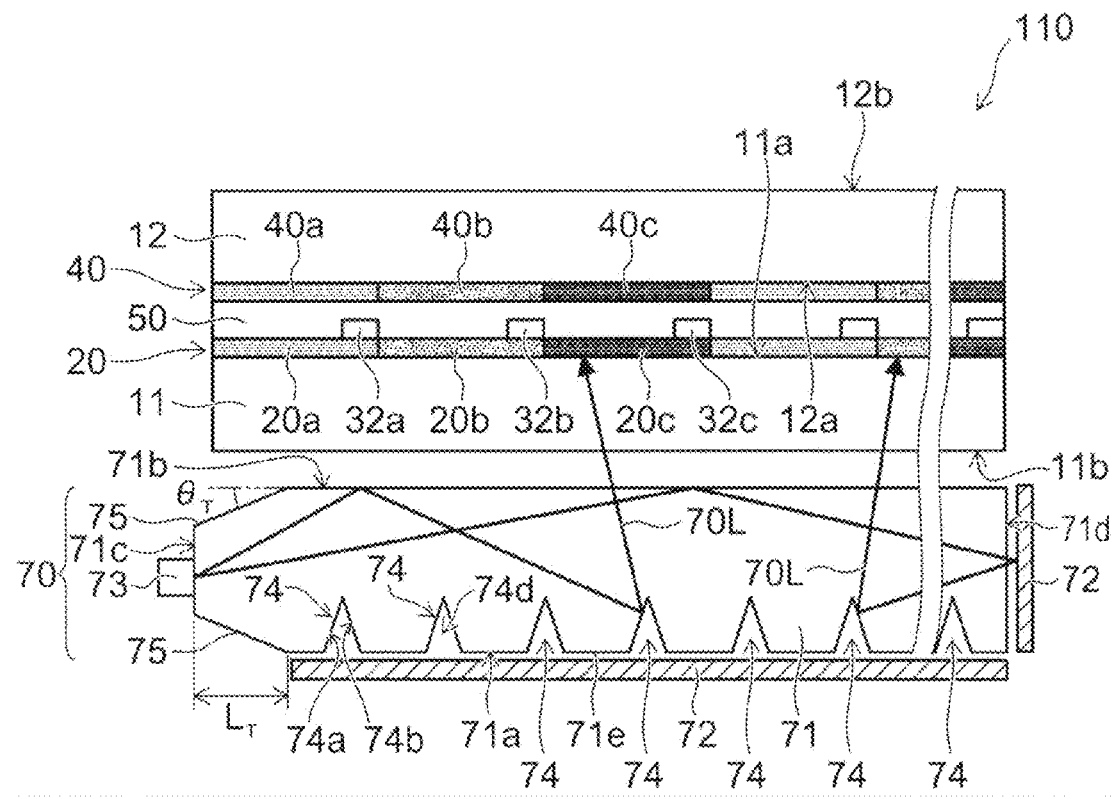
FIG. 1 is a schematic cross-sectional view illustrating a configuration of a display device according to a first embodiment.

According to one embodiment, a display device includes a light-guiding body, a light source, a wavelength selection transmission layer, and a light control layer. The light-guiding body has a first major surface, a second major surface opposite to the first major surface, and a side face connecting the first major surface and the second major surface. The light source causes light to enter an inside of the light-guiding body from the side face. The wavelength selection transmission layer is provided on the second major surface and has a first region and a second region. The first region transmits light of a first wavelength band, of visible light and reflects light of a wavelength band excluding the first wavelength band. The second region transmits light of a second wavelength band different from the first wavelength band, of the visible light and reflects light of a wavelength band excluding the second wavelength band. The light control layer is provided on the wavelength selection transmission layer and changes an intensity of light passing through the light control layer. The first major surface has a plurality of concave portions having inclined faces inclined relative to the first major surface. A ratio of a total area of the plurality of the concave portions projected on the first major surface, relative to an area of the first major surface is 8% to 25%. The plurality of the concave portions is evenly provided in the first major surface.

Embodiments of the invention will now be described with reference to the drawings.

The drawings are schematic or conceptual; and the proportions of sizes among portions, etc., are not necessarily the same as the actual values thereof. Further, the dimensions and the proportions may be illustrated differently among the drawings, even for identical portions.

In the specification and the drawings of the application, components similar to those described in regard to a drawing thereinabove are marked with like reference numerals, and a detailed description is omitted as appropriate.

(First Embodiment)

As an example of a display device according to the embodiment, a liquid crystal display device in which liquid crystal is used will now be described.

FIG. 1 is a schematic cross-sectional view illustrating a configuration of a display device according to a first embodiment.

Figure 2:
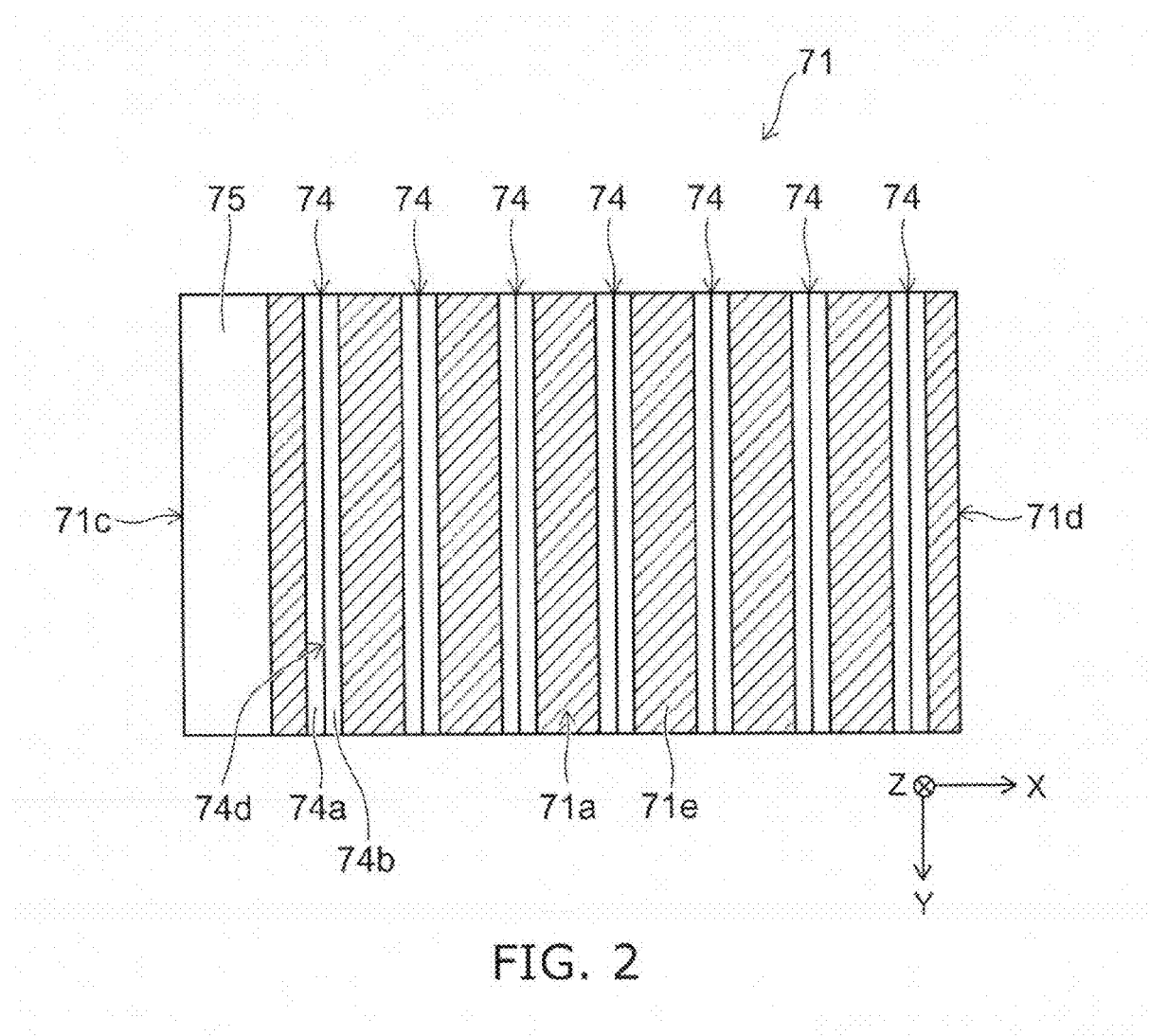
FIG. 2 is a schematic plan view illustrating a light-guiding body of the display device according to the first embodiment.

FIG. 2 is a schematic plan view illustrating a light-guiding body of the display device according to the first embodiment.

Also, FIG. 2 is a schematic plan view when viewed perpendicular to a first major surface 71a of a light-guiding body 71.

As shown in FIG. 1, a display device 110 according to the embodiment includes an illumination unit (a backlight for a display device) 70, a first substrate 11, a wavelength selection transmission layer 20, a light control layer 50, a wavelength selection absorption layer 40, and a second substrate 12.

The illumination unit 70 includes the light-guiding body 71, a reflection film 72, and a light source 73. The light-guiding body 71 has the first major surface 71a, a second major surface 71b opposite to the first major surface 71a, a first side face 71c, and a second side face 71d opposite to the first side face 71c. The first major surface 71a is parallel to the second major surface 71b. The first major surface 71a is a face formed on the side opposite to the side on which the wavelength selection transmission layer 20 and the light control layer 50 are provided. The second major surface 71b is a face formed on the side on which the wavelength selection transmission layer 20 and the light control layer 50 are provided.

As shown in FIGS. 1 and 2, structures 74 are provided in the first major surface 71a of the light-guiding body 71. The structure 74 has, for example, a function of changing the direction of light travel. The structure 74 reflects, for example, light and changes the direction of light travel. As shown in FIG. 2, the structure 74 extends approximately in parallel with the first side face 71c on which the light source 73 is disposed. A structure having a concave-convex shape such as a groove, for example, is used as the structure 74. The display device 110 shown in FIG. 1, a concave portion 74d having a first inclined face 74a and a second inclined face 74b is used as the structure 74.

The reflection films 72 are provided on the first major surface 71a and the second side face 71d of the light-guiding body 71. In the display device 110 shown in FIG. 1, although gaps are provided between the reflection films 72a, and the first major surface 71a and the second side face 71d of the light-guiding body 71, the reflection films 72a may be in contact with the first major surface 71a and the second side face 71d of the light-guiding body 71.

That is, as shown in FIG. 1, the first major surface 71a of the light-guiding body 71 has a plurality of the concave portions 74d having the first inclined face 74a and the second inclined face 74b inclined relative to the first major surface 71a, and flat portions 71e in which the plurality of the concave portions 74d are not provided. The concave portion 74d extends approximately in parallel with the side in contact with the first side face 71c, of the first major surface 71a. In addition, as in the display device 110 shown in FIG. 1, when a tapered portion 75 inclined relative to the first major surface 71a and the first side face 71c is formed, the concave portion 74d extends approximately in parallel with the side in contact with the tapered portion 75, of the first major surface 71a, or the side in contact with the tapered portion 75, of the first side face 71c.

The first inclined face 74a and the second inclined face 74b are not perpendicular to the first side face 71c on which the light source 73 is disposed. That is, the first side face 71c is parallel to the YZ plane, and the first inclined face 74a and the second inclined face 74b are inclined relative to the YZ plane. In other words, when viewed perpendicular to the first major surface 71a of the light-guiding body 71 (when viewed in the Z-axis direction), a normal to the first inclined face 74a and a normal to the second inclined face 74b are parallel to a normal to the first side face 71c. That is, the first inclined face 74a and the second inclined face 74b each have a side approximately parallel to the first side face 71c.

In the light-guiding body 71 shown in FIG. 1, the tapered portion 75 inclined relative to the first major surface 71a and the first side face 71c is formed. In addition, the tapered portion 75 inclined relative to the second major surface 71b and the first side face 71c is formed. In the specification of the application, the angle between the corresponding tapered portion 75 and the first major surface 71a or the second major surface 71b is defined as a tilt angle θT. The tilt angle θT of the tapered portion 75 is about 10°. Furthermore, in the specification of the application, in the schematic cross-section shown in FIG. 1, the length of the corresponding tapered portion 75 in the direction parallel to the first major surface 71a or the second major surface 71b is defined as LT. The length LT of the tapered portion 75 is, for example, about 4 millimeters (mm) to 5 mm. The tapered portion 75 will be described below.

The light source 73 generates light. For example, a semiconductor light emitting device (for example, an LED) is used for the light source 73. The light source 73 is disposed on the first side face 71c of the light-guiding body 71.

The reflection films 72 are attached to the first major surface 71a of the light-guiding body 71 and the second side face 71d of the light-guiding body 71. That is, the light-guiding body 71 is disposed between the reflection film 72 attached to the first major surface 71a and the first substrate 11.

Light generated in the light source 73 enters the inside of the light-guiding body 71 from the first side face 71c. While light entering the inside of the light-guiding body 71 is, for example, totally reflected at the interface between the light-guiding body 71 and air, the light propagates through the light-guiding body 71. Alternatively, while light entering the inside of the light-guiding body 71 is reflected at the reflection films 72, the light propagates through the light-guiding body 71. Also, the second side face 71d may not be perpendicular to, but may be inclined relative to the first major surface 71a so that light reflected at the reflection film 72 attached to the second side face 71d has a directivity angular distribution within a desired range (see FIG. 17).

The structure 74 changes the direction of travel of light propagating thorough the light-guiding body 71, and causes the light to enter the wavelength selection transmission layer 20 efficiently. At this time, as described above, in the display device 110 shown in FIG. 1, the concave portion 74d having the first inclined face 74a and the second inclined face 74b is used as the structure 74. That is, as shown in FIG. 1, the concave portion 74d has the form of a so-called V-shaped groove. The concave portion 74d is open in the first major surface 71a. In other words, the concave portions 74d are provided in portions in which the plurality of flat portions 71e are not provided. The area ratio of the structures 74 is preferably, for example, about 8 to 25%. The area ratio of the structures 74 is more preferably, for example, about 15%. The structures 74 are evenly provided over the entire first major surface 71a. Therefore, the area ratio of the structures 74 is even also in a portion close to the light source 73 and also in a portion away from the light source 73, of the first major surface 71a. That is, the area ratio of the structures 74 is even over the entire first major surface 71a.

Here, in the specification of the application, "area ratio of structures" refers to the proportion and ratio of the total area of the plurality of the concave portions 74d projected on the first major surface 71a, relative to the area of the first major surface 71a. Also, the area of the concave portion 74d projected on the first major surface 71a refers to the rectangular area of the concave portion 74d indicated when the light-guiding body 71 is viewed in the Z-axis direction, and does not refer to the sum of the areas of the first inclined face 74a and the second inclined face 74b (see FIG. 2). That is, in the light-guiding body 71 shown in FIGS. 1 and 2, the area of the concave portion 74d projected on the first major surface 71a can refer to the areas of the first inclined face 74a and the second inclined face 74b projected on the first major surface 71a.

According to this, the amount (light extraction amount) of light output from the light-guiding body 71 toward the wavelength selection transmission layer 20 can be further increased. That is, it is possible to enhance the utilization efficiency of light.

Also, the shape, function, and the like of the structure 74 will be described in detail below.

In this way, the illumination unit 70 causes illumination light 70L to enter the wavelength selection transmission layer along the direction from the wavelength selection transmission layer 20 toward the wavelength selection absorption layer 40. Alternatively, after light output from the light source 73 of the illumination unit 70 propagates through the first substrate 11, and the propagated light travels to the light-guiding body 71 and is reflected at the reflection film 72, the light may enter the wavelength selection transmission layer 20.

The first substrate 11 and the second substrate 12 have optical transparency. Glass, resin, or the like, for example, is used as the first substrate 11 and the second substrate 12. The first substrate 11 has a first major surface 11a and a second major surface 11b opposite to the first major surface 11a.

The wavelength selection transmission layer 20 is provided on the first major surface 11a of the first substrate 11.

Here, the direction perpendicular to the first major surface 11a is defined as the Z-axis direction (first direction). One axis perpendicular to the Z-axis direction is defined as the X-axis direction (second direction). The axis perpendicular to the Z-axis direction and the X-axis direction is defined as the Y-axis direction.

In the specification of the application, a state where a first component is provided on a second component includes: a state where the first component is in contact with the second component, and is disposed on the second component; and in addition, a state where another component is inserted between the first component and the second component, and the first component is disposed on the second component.

The wavelength selection transmission layer 20 has a plurality of regions. In the display device 110 shown in FIG. 1, the wavelength selection transmission layer 20 has a first region 20a, a second region 20b, and a third region 20c. In the XY plane, a plurality of first regions 20a, a plurality of second regions 20b, and a plurality of third regions 20c are provided.

The first region 20a serves as a first color (for example, red) interference filter. The second region 20b serves as a second color (for example, green) interference filter. The third region 20c serves as a third color (for example, blue) interference filter. That is, in the display device 110 shown in FIG. 1, three-color-light selection transmission regions are provided.

However, embodiments are not limited to this. For example, the third region 20c may be not provided, and two color regions may be provided. In addition, a fourth region may be further provided, and four color regions may be provided. In this way, in embodiments, the kind of color is optional. The configuration example of the wavelength selection transmission layer 20 will be described in detail below.

A first switching element 32a is provided on the first region 20a. A second switching element 32b is provided on the second region 20b. A third switching element 32c is provided on the third region 20c. For example, transistors (for example, thin film transistors) are used as the first switching element 32a, the second switching element 32b, and the third switching element 32c.

The light control layer 50 is provided between the wavelength selection transmission layer 20 and the wavelength selection absorption layer 40. Optical properties of the light control layer 50 are variable. A liquid crystal layer, for example, is used as the light control layer 50.

In the display device 110 shown in FIG. 1, the second substrate 12 is provided so as to oppose the first major surface 11a of the first substrate 11. The second substrate 12 has a first major surface 12a and a second major surface 12b facing the first major surface 12a. The first major surface 12a of the second substrate 12 opposes the first major surface 11a of the first substrate 11. The wavelength selection absorption layer 40 is provided on the first major surface 12a of the second substrate 12.

The wavelength selection absorption layer 40 has a first absorption layer 40a, a second absorption layer 40b, and a third absorption layer 40c. The first absorption layer 40a, when viewed in the Z-axis direction, has a portion overlapping with the first region 20a. The second absorption layer 40b, when viewed in the Z-axis direction, has a portion overlapping with the second region 20b. The absorption spectrum of the second absorption layer 40b is different from the absorption spectrum of the first absorption layer 40a. The third absorption layer 40c, when viewed in the Z-axis direction, has a portion overlapping with the third region 20c. The absorption spectrum of the third absorption layer 40c is different from the absorption spectrum of the first absorption layer 40a and the absorption spectrum of the second absorption layer 40b.

The first absorption layer 40a is a first color (for example, red) absorption filter. The second absorption layer 40b is a second color (for example, green) absorption filter. The third absorption layer 40c is a third color (for example, blue) absorption filter.

For example, a voltage (for example, an electric field) is applied to the light control layer 50 via a switching element. In response to a applied voltage (for example, an electric field), optical properties of the light control layer 50 change, the transmittances of pixels changes, and display is performed.

When a liquid crystal layer is used as the light control layer 50, the alignment of the liquid crystal of the liquid crystal layer changes depending on an applied voltage (for example, an electric field). Optical properties (including at least any of birefringence index, optical rotation property, scattering property, diffraction property, light absorptivity, and the like) of the liquid crystal layer change depending on alignment change.

For example, a first polarization layer (not shown) is provided on the second major surface 11b of the first substrate 11. In addition, a second polarization layer (not shown) is provided on the second major surface 12b of the second substrate 12. That is, the first substrate 11, the wavelength selection transmission layer 20, the light control layer 50, the wavelength selection absorption layer 40, and the second substrate 12 are disposed between the first polarization layer and the second polarization layer. Thereby, the change of optical properties of the light control layer 50 (liquid crystal layer) is converted into the change of light transmittance, and display is performed.

Figure 3:
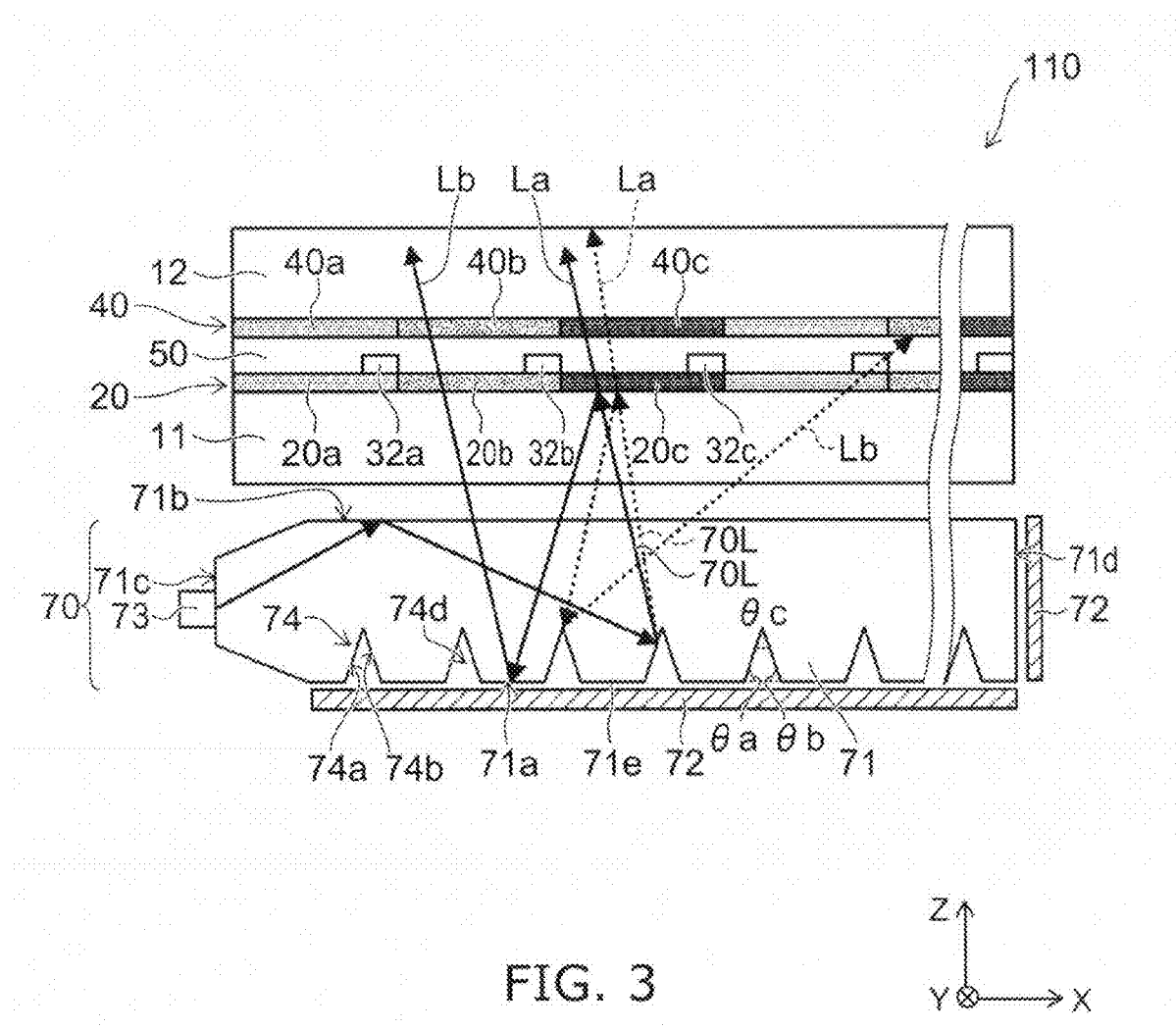
FIG. 3 is a schematic cross-sectional view illustrating the operation of the display device according to the first embodiment.

FIG. 3 is a schematic cross-sectional view illustrating the operation of the display device according to the first embodiment.

Figure 4:
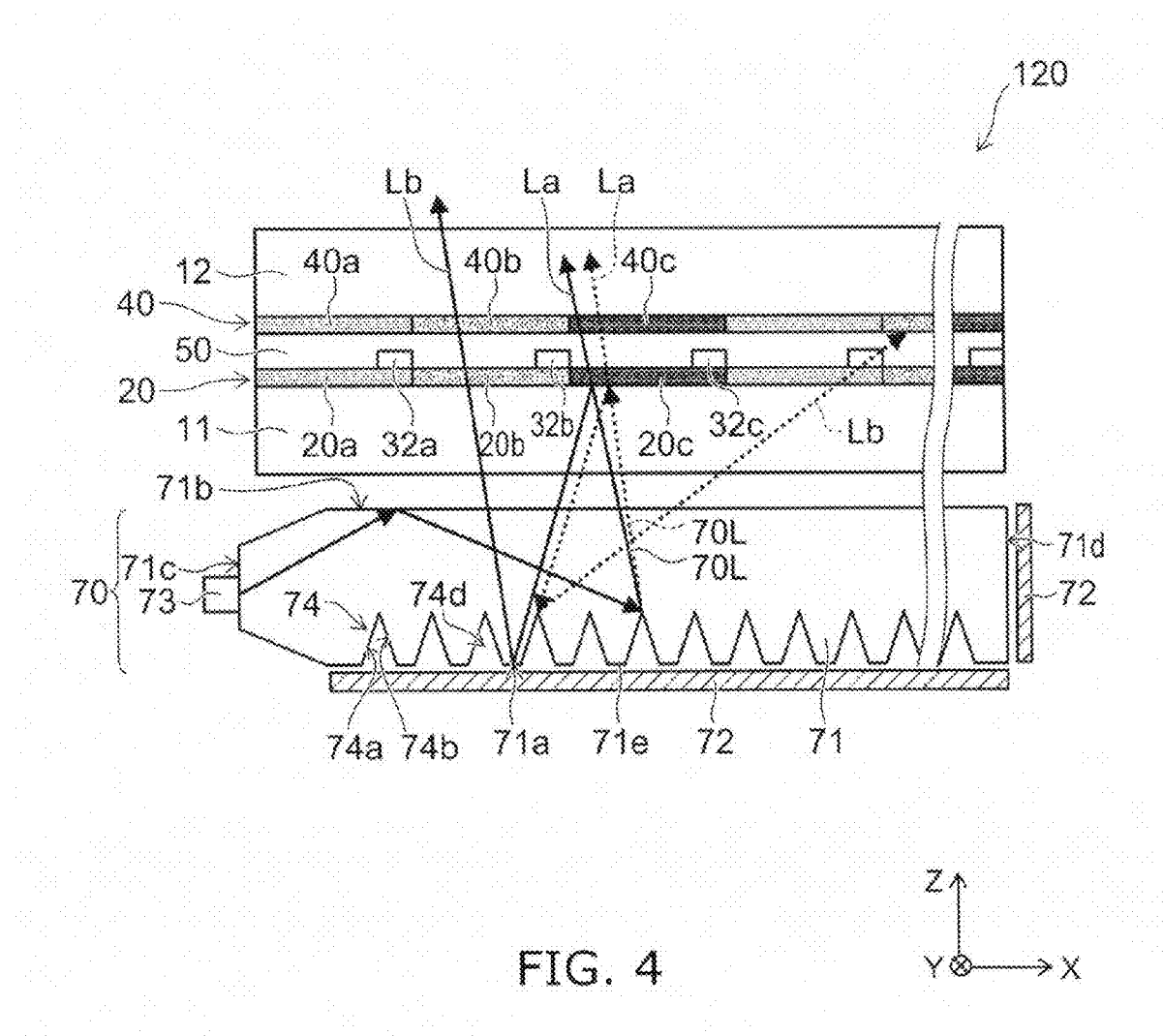
FIG. 4 is a schematic cross-sectional view illustrating the operation of a display device according to a reference example.

FIG. 4 is a schematic cross-sectional view illustrating the operation of a display device according to a reference example.

Figure 5:
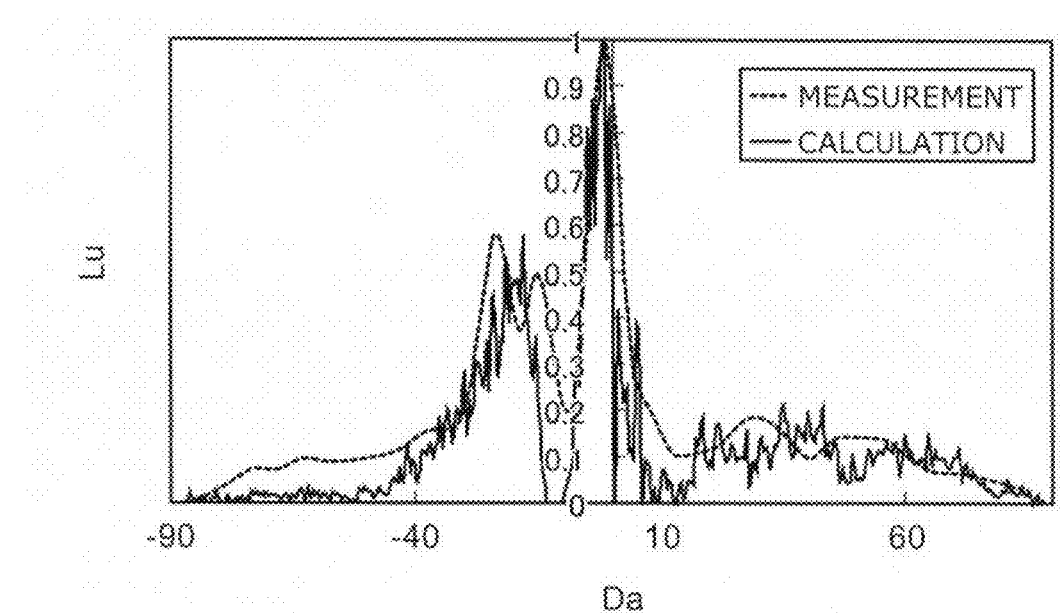
FIG. 5 is a graph diagram illustrating the directivity angular distribution of light output from a light-guiding body.

FIG. 5 is a graph diagram illustrating the directivity angular distribution of light output from a light-guiding body.

Also, the longitudinal axis in FIG. 5 is the brightness Lu normalized by the maximum value, and the horizontal axis in FIG. 5 is the directivity angle Da of light output from the light-guiding body. In addition, the graph diagram shown in FIG. 5 represents the brightness Lu and the directivity angle Da of light before the light enters the wavelength selection transmission layer 20. In other words, the graph diagram shown in FIG. 5 represents the brightness Lu and the directivity angle Da of light immediately after the light is output from the illumination unit 70.

First, an example of the wavelength selection transmission layer 20 will be described.

The wavelength selection transmission layer 20 transmits light with a specific wavelength, and reflects light with a wavelength other than the specific wavelength. The wavelength selection transmission layer 20 has, for example, a Fabry-Perot type interference filter.

That is, the wavelength selection transmission layer 20 has a spacer layer provided between a pair of reflection layers and a pair of reflection layers, and is formed by, for example, an insulating layer. The wavelength selection transmission layer 20 has a structure in which a plurality of dielectric films having respective different refractive indexes are stacked. The dielectric films stacked in the wavelength selection transmission layer 20 contain at least any of silicon oxide, silicon nitride, and silicon oxynitride.

A part of incident light is reflected at the interfaces of stacked films inside the first region 20a. Then, light with a wavelength satisfying constructive phase conditions that is obtained by superposing light (wave) reflected at the interfaces of the stacked films and transmitted light (wave) passes through the first region 20a, and light with a wavelength other than it is reflected. In other words, light with a wavelength corresponding to the thickness of the first region 20a passes through the first region 20a, and light with a wavelength other than it is reflected. This function is the same for the functions of the second region 20b and the third region 20c.

The optical path length (optical distance) when light passes through the wavelength selection transmission layer 20 in the case where the angle (incidence angle) of the light incident on the wavelength selection transmission layer 20 is larger than zero is longer than the optical path length in the case where the angle is zero. In other words, the optical distance when light passes through the wavelength selection transmission layer 20 in the case where the light is incident obliquely on the wavelength selection transmission layer 20 is longer than the optical distance in the case where the light is perpendicularly incident on the wavelength selection transmission layer 20. At this time, the wavelength satisfying constructive phase conditions in the case where light is incident obliquely on the wavelength selection transmission layer 20 is shorter than the wavelength satisfying constructive phase conditions in the case where light is perpendicularly incident on the wavelength selection transmission layer 20. The wavelength of light passing through the wavelength selection transmission layer 20 depends on the incidence angle of the light incident on the wavelength selection transmission layer 20.

In this way, in a display device, if an interference type color filter is used, its transmission wavelength band changes in accordance with the incidence angle of light. For example, the transmission wavelength band relative to obliquely incident light shifts to a wavelength side (blue side) shorter than the transmission wavelength band relative to light incident from the front.

For example, when red light enters the wavelength selection transmission layer 20 obliquely, at least a part of the light passing through the wavelength selection transmission layer 20 becomes light such as orange light, or the like with a wavelength shorter than a wavelength of red light. Alternatively, for example, when green light enters the wavelength selection transmission layer 20 obliquely, at least a part of the light passing through the wavelength selection transmission layer 20 becomes light such as cyan light, or the like with a wavelength shorter than a wavelength of green light. Then, light with a wavelength shorter than the wavelength of light incident on the wavelength selection transmission layer 20, of the light passing through the wavelength selection transmission layer 20 is absorbed by the wavelength selection absorption layer 40 provided on the wavelength selection transmission layer 20. That is, light loss is caused. Therefore, in order to realize a high light utilization efficiency, it is desirable that the angle of light output from the illumination unit 70 or the light-guiding body 71 is made smaller.

Alternatively, in a display device in which the wavelength selection absorption layer 40 is not provided, the color of light passing through the wavelength selection transmission layer 20 deviates from the design value. Therefore, in order to obtain a desired color from light passing through the wavelength selection transmission layer 20, it is desirable that the angle of light output from the illumination unit 70 or the light-guiding body 71 is made smaller.

Also, the angle of light output from the illumination unit 70 or the light-guiding body 71 is equal to the angle of light incident on the wavelength selection transmission layer 20, i.e., the angle of incidence on the wavelength selection transmission layer 20.

Here, as shown in FIG. 4, the number of the structures 74 formed in the light-guiding body 71 of the display device 120 according to the reference example is larger than the number of the structures 74 formed in the light-guiding body 71 of the display device 110 according to the embodiment. Thereby, it is possible to increase the light extraction amount of light output from the light-guiding body 71. However, if the number of the structures 74 formed in the light-guiding body 71 is large, the angle of light output from the light-guiding body 71 is large. This will be described with reference to FIG. 4.

As described above in relation to FIGS. 1 and 2, while light entering the inside of the light-guiding body 71 is, for example, totally reflected at the interface between the light-guiding body 71 and air, or is reflected at the reflection film 72, the light propagates through the light-guiding body 71. Then, the direction of travel of light impinging on the structure 74 is changed, and the light enters the wavelength selection transmission layer 20 as the illumination light 70 L.

First light La having a first wavelength band λa, of the illumination light 70 L passes through, for example, the third region 20c of the wavelength selection transmission layer 20. The first light La passes through the light control layer 50, further passes through the third absorption layer 40c, and is output to the outside. In accordance with the state of the light control layer 50, the intensity of light output to the outside changes.

In contrast, light having a wavelength band other than the first wavelength band λa, of the illumination light 70 L (for example, second light Lb having a second wavelength band λb) is reflected at, for example, the third region 20c, of the wavelength selection transmission layer 20, and returns to the illumination unit 70. Here, the major surface of at least any of the plurality of layers that the wavelength selection transmission layer 20 has is parallel to the first major surface 71a of the light-guiding body 71. At least any of the plurality of layers that the wavelength selection transmission layer 20 has is, for example, a reflection layer, or the like that is not shown. Thereby, light having a wavelength band other than the first wavelength band λa, of the illumination light 70 L is reflected at, for example, the third region 20c, and can more certainly return to the illumination unit 70. Light returned to the illumination unit 70 passes through the light-guiding body 71, and again enters the wavelength selection transmission layer 20.

As describe above, the number of the structures 74 formed in the light-guiding body 71 of the display device 120 according to the reference example is larger than the number of the structures 74 formed in the light-guiding body 71 of the display device 110 according to the embodiment. Therefore, the frequency at which the second light Lb returned to the inside of the light-guiding body 71 of the display device 120 according to the reference example impinges on the structure 74 is higher than the frequency at which the second light Lb returned to the light-guiding body 71 of the display device 110 according to the embodiment impinges on the structure 74.

As shown in FIG. 4, when the second light Lb reflected at the wavelength selection transmission layer 20 and returned to the inside of the light-guiding body 71 impinges on the structure 74, since the travel direction is changed by the structure 74, the angle of the light output from the light-guiding body 71 can be larger than the angle in the case where the second light Lb does not impinge on the structure 74. Therefore, such light again enters the wavelength selection transmission layer 20, and even if the light passes through the wavelength selection transmission layer 20, the light is absorbed by the wavelength selection absorption layer 40. Therefore, there is a case where a high light utilization efficiency cannot be realized. In this way, the structure 74 can increase the light extraction amount of light output from the light-guiding body 71. In contrast, the structure 74 increases the angle of light at which the second light Lb having reflected at the wavelength selection transmission layer 20 and having returned to the inside of the light-guiding body 71 is output from the light-guiding body 71.

In addition, as a reference example, there is a case where the illumination unit 70 includes an optical sheet such as a prism sheet. A prism sheet can reduce the angle of light output from the light-guiding body 71. However, in a manner similar to the structure 74, if the second light Lb reflected at the wavelength selection transmission layer 20 and returned to the inside of the light-guiding body 71 impinges on a prism sheet, the angle of the light output from the light-guiding body 71 becomes larger than the angle in the case where the second light Lb does not impinge on the prism sheet.

Therefore, light enters the wavelength selection transmission layer 20 obliquely, and becomes light with a shorter wavelength. Thus, the light is absorbed by the wavelength selection absorption layer 40. In order to suppress this, it is desirable that the light-guiding body 71 has the structure 74 that causes light to perpendicularly enter the wavelength selection transmission layer 20, without using an optical sheet such as a prism sheet. Furthermore, to the extent that light reflected at the wavelength selection transmission layer 20 and returned to the inside of the light-guiding body 71 impinges on the structures 74, and the angular distribution of the entire light output from the light-guiding body 71 is not significantly disturbed, it is desirable that the number of the structures 74 formed in the light-guiding body 71 is suppressed.

In contrast to this, as shown in FIG. 3, the number of the structures 74 formed in the light-guiding body 71 of the display device 110 according to the embodiment is smaller than the number of the structures 74 in the light-guiding body 71 of the display device 120 according to the reference example. Specifically, the area ratio of the structures 74 is, for example, about 8 to 25%. The area ratio of the structures 74 is more preferably, for example, about 15%. In addition, the illumination unit 70 of the display device 110 according to the embodiment does not include an optical sheet such as a prism sheet. For example, an air layer is formed between the illumination unit 70 and the first substrate 11. Alternatively, for example, the illumination unit 70 is in contact with the first substrate 11.

As describe above in relation to the display device 120 according to the reference example, the first light La having a first wavelength band λa, of the illumination light 70 L passes through, for example, the third region 20c of the wavelength selection transmission layer 20. The first light La passes through the light control layer 50, further passes through the third absorption layer 40c, and is output to the outside. In accordance with the state of the light control layer 50, the intensity of light output from to the outside changes.

In contrast, light having a wavelength band other than the first wavelength band λa (for example, the second light Lb having the second wavelength band λb), of the illumination light 70 L is reflected at the third region 20c of the wavelength selection transmission layer 20, and returns to the illumination unit 70. As describe above, the number of the structures 74 formed in the light-guiding body 71 of the display device 110 according to the embodiment is smaller than the number of the structures 74 formed in the light-guiding body 71 of the display device 120 according to the reference example. Therefore, the frequency at which the second light Lb returned to the light-guiding body 71 of the display device 110 according to the embodiment impinges on the structure 74 is lower than the frequency at which the second light Lb returned to the inside of the light-guiding body 71 of the display device 120 according to the reference example impinges on the structure 74. That is, the possibility is low that, by the second light Lb impinging on the structure 74, the direction of travel of the second light Lb is changed and the angle of incidence on the wavelength selection transmission layer 20 becomes larger.

As shown in FIG. 3, when the second light Lb having reflected at the wavelength selection transmission layer 20 and having returned to the inside of the light-guiding body 71 is reflected at the reflection film 72, the light enter the wavelength selection transmission layer 20. Then, the second light Lb passes through, for example, the second region 20b of the wavelength selection transmission layer 20. The second light Lb passes through the light control layer 50, further passes through the second absorption layer 40b, and is output to the outside. In accordance with the state of the light control layer 50, the intensity of light output to the outside changes.

In this way, in the display device 110 according to the embodiment, light other than light of a specific wavelength region the wavelength selection transmission layer 20 transmits returns to the illumination unit 70. Then, the light is reflected at the reflection film 72 in a state where the frequency at which the light impinges on the structure 74 is reduced. Thus, the light is reused. Because of this, it is possible to obtain a high light utilization efficiency. Thereby, it is possible to obtain a display in which the color is beautiful, the display is bright, and the contrast is favorable. In addition, it is possible to reduce power consumption.

Here, an example of the structure 74 will be described.

As described above in relation to FIGS. 1 and 2, the concave portion 74d of the display device 110 according to the embodiment includes the first inclined face 74a and the second inclined face 74b, and has the form of a V-shaped groove. For example, a cross-section when the structure 74 is viewed in the longitudinal direction (extending direction) has the form of an isosceles triangle in which the apex angle θc is about 96°. That is, the angle θa between the flat portion 71e and the first inclined face 74a (hereinafter, referred to as "tilt angle of the first inclined face 74a") and the angle θb between the flat portion 71e and the second inclined face 74b (hereinafter, referred to as "tilt angle of the second inclined face 74b") are about 42°. As a result of the study of the inventor, it has been found that when the tilt angle θa of the first inclined face 74a and the tilt angle θb of the second inclined face 74b are about 40° to 50°, the angle of light output from the light-guiding body 71 becomes smaller. This will be described in detail below.

The form of the groove (the concave portion 74d) is not limited to a bilaterally symmetric V-shape. That is, the tilt angle θa of the first inclined face 74a is not necessarily the same as the tilt angle θb of the second inclined face 74b. For example, the tilt angle θa of the first inclined face 74a and the tilt angle θb of the second inclined face 74b may be individually appropriately set so that the angle of light output from the light-guiding body 71 becomes smallest, based on a directivity angular distribution of light traveling from the first side face 71c of the light-guiding body 71, and a directivity angular distribution of light reflected from the second side face 71d. The angle of light output from the light-guiding body 71 is determined by the tilt angle θa of the first inclined face 74a, the tilt angle θb of the second inclined face 74b, and the directivity angular distribution of light entering the groove.

An example of the tapered portions 75 will now be described.

As described above in relation to FIGS. 1 and 2, the tapered portions 75 are formed in the light-guiding body 71. The tapered portions 75 can reduce the directivity angular distribution of light traveling the inside of the light-guiding body 71, in the thickness direction (Z-axis direction) of the light-guiding body 71.

For example, in view of the refraction of light at the interface between the light-guiding body 71 and air, the directivity angle of light traveling the inside of the light-guiding body 71 is about 42° at maximum. Therefore, the tilt angle θT of the tapered portion 75 (see FIG. 1) is preferably about 10°. In addition, the length LT of the tapered portion 75 (see FIG. 1) is preferably about 4 mm to 5 mm.

When the tilt angle θT of the tapered portion 75 is 10°, the angle at which light is output from the tapered portion 75 becomes smaller by 10°, by the total reflection at the tapered portion 75, of the light traveling the inside of the light-guiding body 71, as compared with the incidence angle in the case where there is no tapered portion 75. Therefore, when the length LT of the tapered portion 75 is set so that the entire light entering the light-guiding body 71 from the light source 73 is totally reflected at the tapered portion 75 at least once, it is possible to suppress, at not more than about 22°, the directivity angular distribution in the thickness direction of the light-guiding body 71.

In this way, if the structure 74 is irradiated with light whose directivity angular distribution in the thickness direction of the light-guiding body 71 is suppressed at not more than about 22°, when the tilt angle θa of the first inclined face 74a and the tilt angle θb of the second inclined face 74b of the concave portion 74d having the form of a V-shaped groove are about 40° to 50°, it is possible to suppress, at not more than 40°, the light not less than about 70% of the light output from the light-guiding body 71 as shown in FIG. 5.

An example of characteristics of a display device according to the first embodiment will now be described. That is, an example of a simulation result and experimental result of characteristics of a display device according to the first embodiment will be described.

Figure 6:
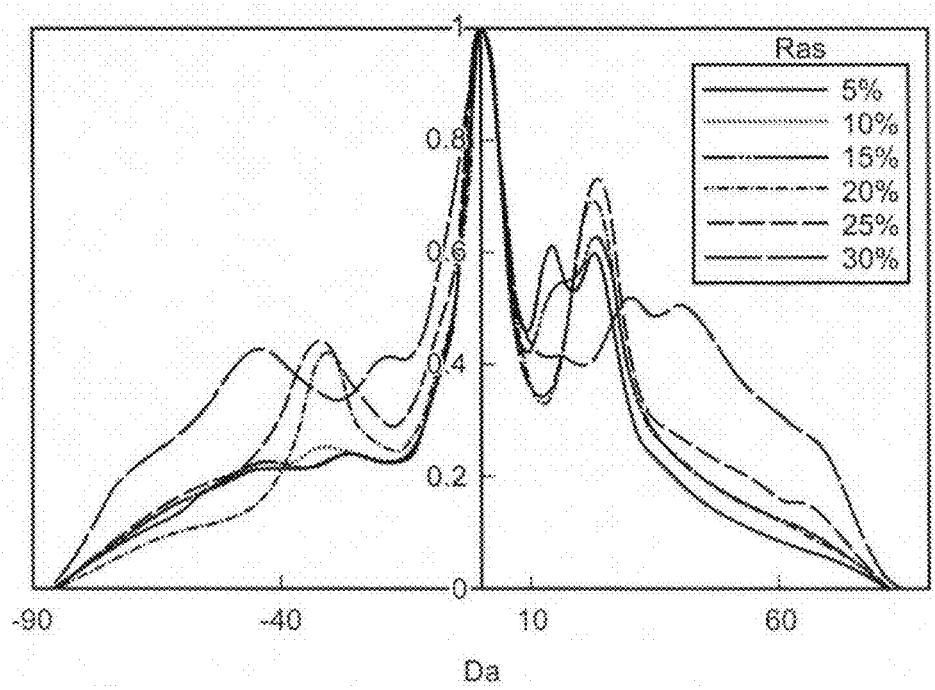
FIG. 6 is a graph diagram illustrating an experimental result of characteristics of the display device according to the first embodiment.

FIG. 6 is a graph diagram illustrating an experimental result of characteristics of the display device according to the first embodiment.

Figure 7:
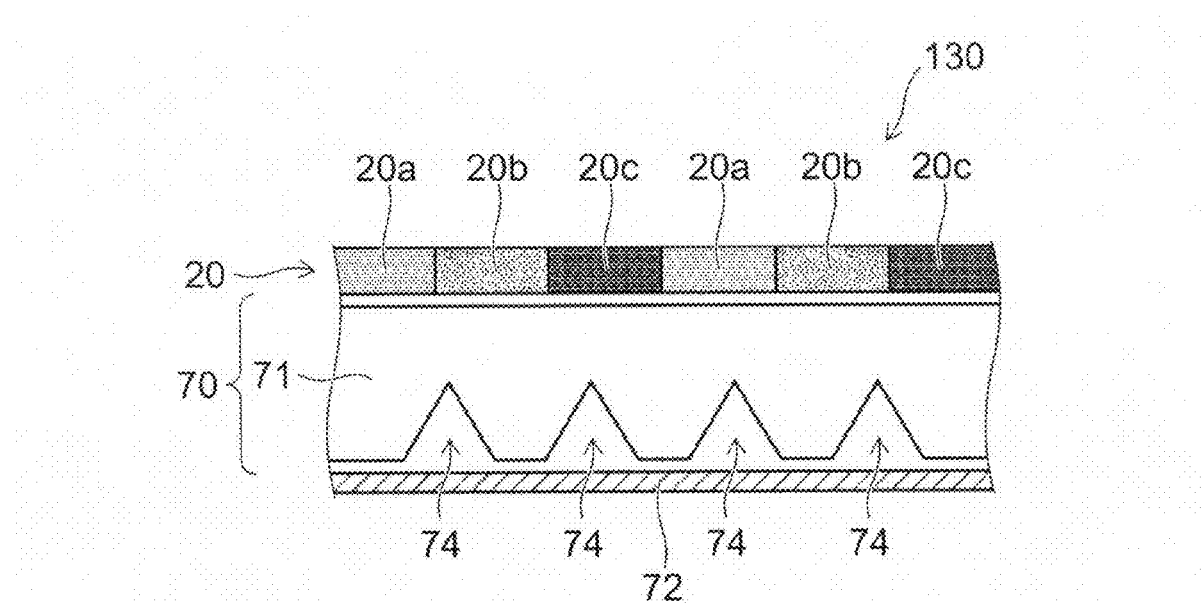
FIG. 7 is a schematic cross-sectional view illustrating a display device used in this experiment.

FIG. 7 is a schematic cross-sectional view illustrating a display device used in this experiment.

The longitudinal axis in FIG. 6 is the brightness Lu normalized by the maximum value. The horizontal axis in FIG. 6 is the directivity angle Da of light output from the light-guiding body.

As shown in FIG. 7, a display device 130 used in this experiment includes the illumination unit 70 and the wavelength selection transmission layer 20. The display device 130 used in this experiment does not include the wavelength selection absorption layer 40. Then, in this experiment, in each of the cases where the area ratio Ras of the structures 74 is 5%, 10%, 15%, 20%, 25%, and 30%, the brightness Lu and the directivity angle Da of light that is output from the illumination unit 70 and passes through the wavelength selection transmission layer 20 was measured. Since the wavelength selection transmission layer 40 is not provided, light whose brightness Lu and directivity angle Da is measured does not pass through the wavelength selection transmission layer 40.

The result of this experiment is shown in FIG. 6. According to this, it can be found that the higher the area ratio Ras of the structures 74 is, the broader the directivity angular distribution of light output from the illumination unit 70 (the light-guiding body 71) is. Then, according to this, it can be found that when the area ratio Ras of the structures 74 is not more than 15%, the directivity angular distribution of light output from the light-guiding body 71 can be suppressed in a relatively narrow range. In contrast, it can be found that when the area ratio Ras of the structures 74 is not more than 25%, the directivity angular distribution of light output from the light-guiding body 71 is relatively broad.

Figure 8:
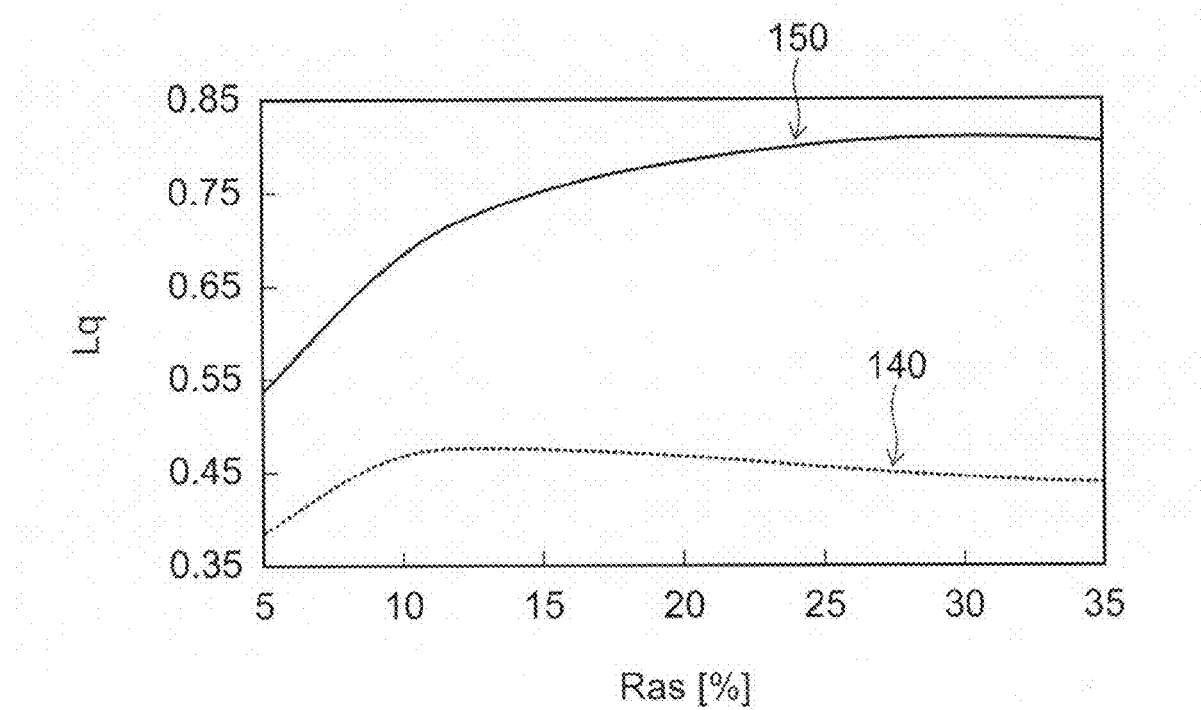
FIG. 8 is a graph diagram illustrating a simulation result of other characteristics of the display device according to the first embodiment.

FIG. 8 is a graph diagram illustrating a simulation result of other characteristics of the display device according to the first embodiment.

Figure 9:
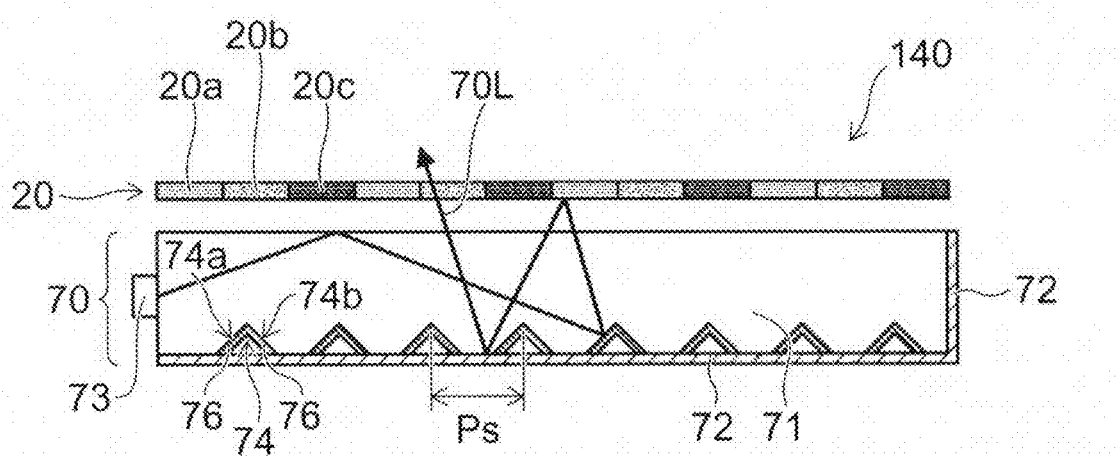
FIG. 9 is a schematic cross-sectional view illustrating a model of the display device according to the first embodiment.

FIG. 9 is a schematic cross-sectional view illustrating a model of the display device according to the first embodiment.

Figure 10:
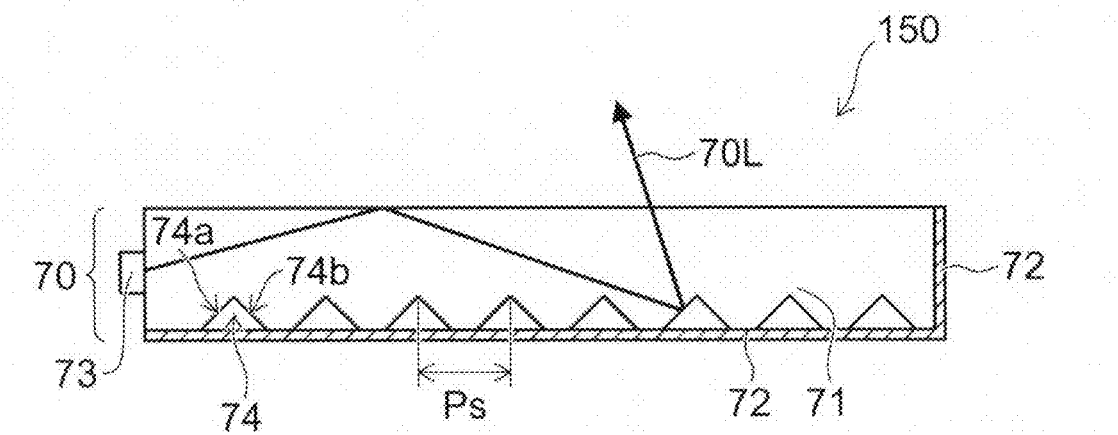
FIG. 10 is a schematic cross-sectional view illustrating a model of the display device according to the reference example.

FIG. 10 is a schematic cross-sectional view illustrating a model of the display device according to the reference example.

The longitudinal axis in FIG. 8 is the light extraction amount Lq. The horizontal axis in FIG. 8 is the area ratio Ras of structures.

As shown in FIG. 9, a model of a display device 140 according to the first embodiment includes the illumination unit 70 and the wavelength selection transmission layer 20. The model of the display device 140 according to the first embodiment does not include the wavelength selection absorption layer 40.

The first inclined face 74a and the second inclined face 74b are coated with a low reflectance coating 76 for an experiment. The reflectance of the low reflectance coating 76 is 85%. That is, the low reflectance coating 76 reflects 85% of incident light, and absorbs the light of the remaining 15%. A metal coating, for example, is used as the low reflectance coating 76.

The reflectance of the reflection film 72 is 99%.

Pitches Ps of the structures 74 are approximately constant in the entire light-guiding body 71. Here, the pitch Ps of the structures 74 refers to a distance between the tops of adjacent V-shaped grooves.

As shown in FIG. 10, a model of a display device 150 according to a reference example includes the illumination unit 70. The model of the display device 150 according to the reference example does not include the wavelength selection transmission layer 20 and the wavelength selection absorption layer 40. Therefore, in the model of the display device 150 according to the reference example, no light is reflected in a specific region of the wavelength selection transmission layer 20. In addition, no light returns to the illumination unit 70, and is reused. Furthermore, as in the model of the display device 140 according to the first embodiment shown in FIG. 9, the low reflectance coating 76 is not applied.

In a manner similar to the model of the display device 140 according to the first embodiment, the reflectance of the reflection film 72 is 99%. In addition, the pitches Ps of the structures 74 are approximately constant in the entire light-guiding body 71. The pitch Ps of the structures 74 is preferably, for example, about 70 μm to 100 μm.

In this simulation, in each of the models shown in FIGS. 9 and 10, the light extraction amount Lq relative to the area ratio Ras of the structures is calculated. The result of this simulation is shown in FIG. 8. According to this, no light returns to the illumination unit 70, and is reused, in the model of the display device 150 according to the reference example. Therefore, as the area ratio Ras of the structures 74 becomes higher, the light extraction amount Lq of light output from the light-guiding body 71 increases. Then, when the wavelength selection absorption layer 40 is provided in such a display device, light having a wavelength band other than a specific wavelength band is absorbed by the wavelength selection absorption layer 40. That is, light loss is generated.

In contrast, in the model of the display device 140 according to the first embodiment, the light extraction amount Lq of light output from the light-guiding body 71 increases, until the area ratio Ras of the structures 74 reaches about 13%. This is because light extraction efficiency is enhanced by the structures 74. In addition, as the area ratio Ras of the structures 74 becomes higher than about 15%, the light extraction amount Lq of light output from the light-guiding body 71 decreases.

As describe above, the reflectance of the low reflectance coating 76 is 85%. The more the number of times light impinges on the low reflectance coating 76 is, the more the light is absorbed by the low reflectance coating 76. In addition, the higher the area ratio Ras is, the more the number of times light having reflected at the wavelength selection transmission layer 20 and having returned to the illumination unit 70 impinges on the structures 74 is. That is, the decrease of the light extraction amount Lq means that the number of times light impinges on the structures 74 is large. Then, this means that the more the number of times light impinges on the structures 74 is, the higher the probability that the angle of incidence on the wavelength selection transmission layer 20 becomes larger is. For these reasons, as in this simulation, as the first inclined face 74a and the second inclined face 74b are coated with the low reflectance coating 76 with a relatively low reflectance, and the area ratio Ras of the structures 74 is made higher, it is supposed that when the area ratio Ras of the structures 74 becomes higher than a certain value, the light extraction amount Lq decreases. At this time, it is supposed that the area ratio Ras of the structures 74 is about 15%. As described above, as the area ratio Ras becomes higher than about 13%, the frequency increases at which light reflected at the wavelength selection transmission layer 20 and returned to the inside of the light-guiding body 71 impinges on the structures 74. A force of the structures 74 that increases the angle of light output from the light-guiding body 71 is larger than a force of the structures 74 that increases the light extraction amount Lq of light output from the light-guiding body 71.

Figure 11:
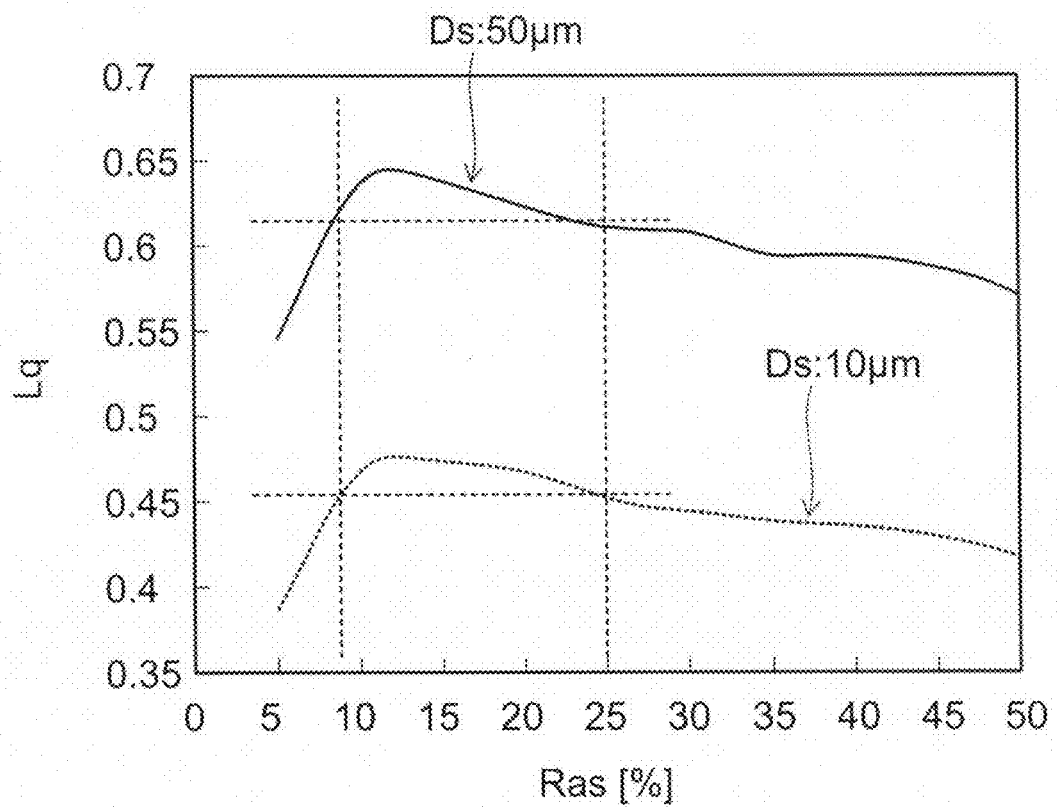
FIG. 11 is a graph diagram illustrating a simulation result of further characteristics of the display device according to the first embodiment.

FIG. 11 is a graph diagram illustrating a simulation result of further characteristics of the display device according to the first embodiment.

Figure 12:
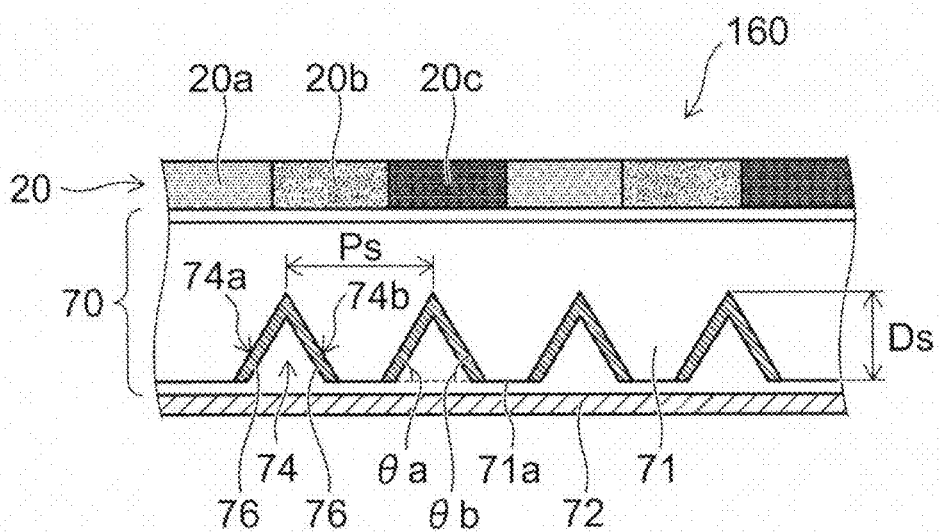
FIG. 12 is a schematic cross-sectional view illustrating the model of the display device according to the first embodiment.

FIG. 12 is a schematic cross-sectional view illustrating the model of the display device according to the first embodiment.

Also, the longitudinal axis in FIG. 11 is the light extraction amount Lq. The horizontal axis in FIG. 11 is the area ratio Ras of structures.

As shown in FIG. 12, a model of a display device 160 according to the first embodiment includes the illumination unit 70 and the wavelength selection transmission layer 20. The model of the display device 140 according to the first embodiment does not include the wavelength selection absorption layer 40.

A cross-section when the light-guiding body 74 is viewed in the longitudinal direction has the form of an isosceles triangle in which the tilt angle θa of the first inclined face 74a and the tilt angle θb of the second inclined face 74b are 45°. The first inclined face 74a and the second inclined face 74b are coated with a low reflectance coating 76. The reflectance of the low reflectance coating 76 is 85%. That is, the low reflectance coating 76 reflects 85% of incident light, and absorbs the light of the remaining 15%. A metal coating, for example, is used as the low reflectance coating 76.

The reflectance of the reflection film 72 is 99%.

Pitches Ps of the structures 74 are approximately constant in the entire light-guiding body 71. The pitch Ps of the structures 74 is preferably, for example, about 70 μm to 100 μm.

Here, the depth Ds of the structure 74 refers to the distance between the first major surface 71a and the top of a V-shaped groove, of the light-guiding body 71.

In this simulation, in each of the cases where the depths Ds of the structures 74 are set to 10 μm and 50 μm, the light extraction amount Lq relative to the area ratio Ras of the structures is calculated. The result of this simulation is shown in FIG. 11. According to this, in the cases where the depths Ds of the structures 74 are 10 μm and 50 μm, the light extraction amount Lq of light output from the light-guiding body 71 increases, until the area ratio Ras of the structures 74 reaches about 15%. In contrast, as the area ratio Ras of the structures 74 becomes higher than about 15%, the light extraction amount Lq of light output from the light-guiding body 71 decreases. It is considered that this is the same as the reason described above in relation to FIGS. 8 to 10.

In addition, it can be found that when the area ratio Ras of the structures 74 is, for example, 8 to 25%, the light extraction amount Lq of light output from the light-guiding body 71 can be maintained so as to be larger amounts. In other words, when the area ratio Ras of the structures 74 is lower than 8%, or the area ratio Ras of the structures 74 is higher than 25%, it is difficult to maintain the light extraction amount Lq of light output from the light-guiding body 71 so as to be larger amounts. Thereby, the area ratio of the structures 74 is preferably, for example, about 8 to 25%. Furthermore, the depth Ds of the structure 74 is preferably, for example, about 5 μm to 7 μm.

Figure 13A:
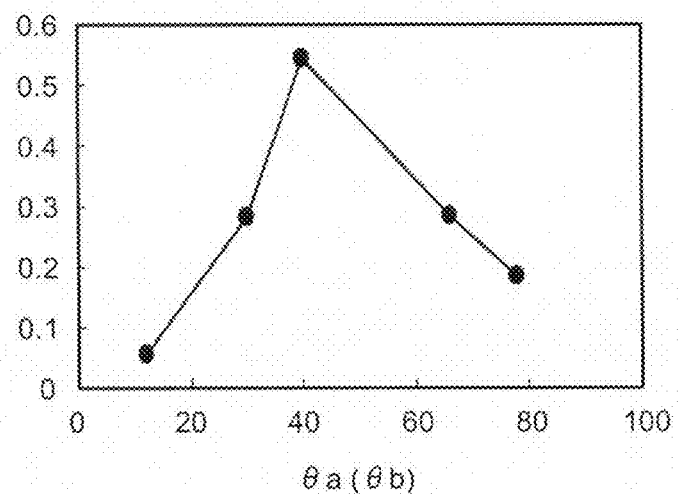
FIGS. 13A and 13B are graph diagrams illustrating a simulation result and experimental result of further characteristics of the display device according to the first embodiment.
Figure 13B:
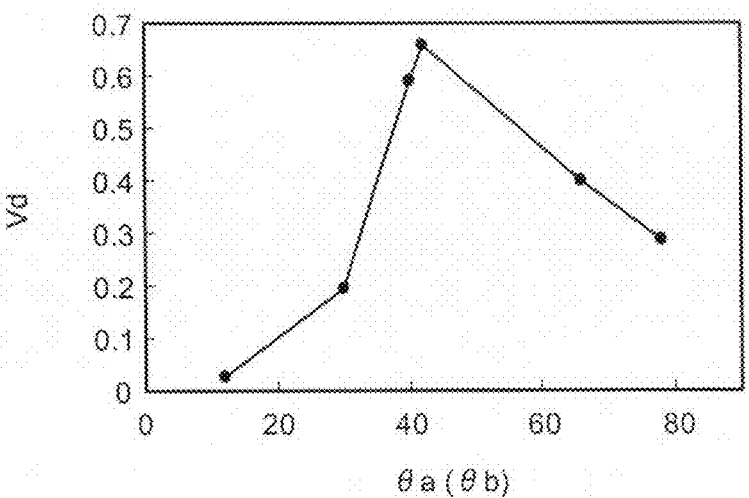

FIGS. 13A and 13B are graph diagrams illustrating a simulation result and experimental result of further characteristics of the display device according to the first embodiment.

Figure 14:
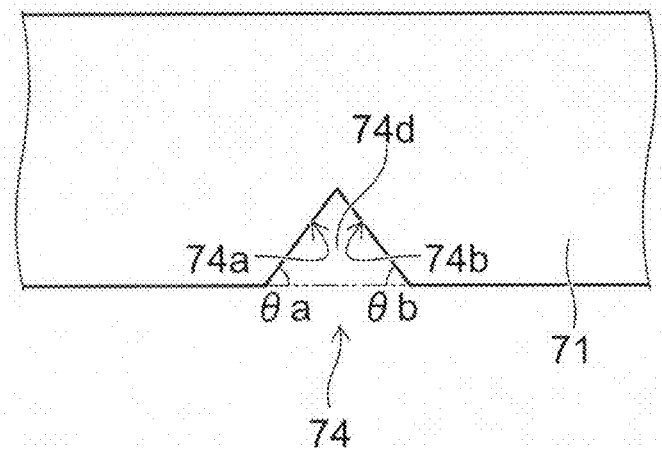
FIG. 14 is a schematic cross-sectional view illustrating a model of a light-guiding body and a light-guiding body used in the experiment.

FIG. 14 is a schematic cross-sectional view illustrating a model of a light-guiding body and a light-guiding body used in the experiment.

The longitudinal axis in FIGS. 13A and 13B is the directional value Vd. The horizontal axis in FIGS. 13A and 13B is the tilt angle θa (θb). In addition, FIG. 13A is a graph diagram illustrating the simulation result. In addition, FIG. 13A is a graph diagram illustrating the experimental result.

As described above in FIG. 14, the concave portions 74d formed in the light-guiding body 71 of the model for this simulation and the light-guiding body 71 of a sample for this experiment have the form of a V-shaped groove. The tilt angle θa of the first inclined face 74a is the same as the tilt angle θb of the second inclined face 74b. That is, a cross-section when the structure 74 is viewed in the longitudinal direction has the form of an isosceles triangle.

In this simulation, directional values of light output from the light-guiding body 71 relative to the tilt angle θa of the first inclined face 74a (the tilt angle θb of the second inclined face 74b) are calculated and measured.

Here, in the specification of the application, "directional value" refers to the proportion of the light amount of light in which the angle of the light output from the light-guiding body 71 is not more than 30°, of the light amount of the entire light output from the light-guiding body 71. Therefore, this means that when the directional value is larger, the directivity angular distribution of light output from the light-guiding body 71 is suppressed in a narrower range.

The result of this simulation is shown in FIG. 13A. In addition, the result of this experiment is shown in FIG. 13B. According to these, it can be found that when the tilt angle θa (θb) is about 40° to 50°, the directional value Vd of light output from the light-guiding body 71 is maintained so as to be relatively higher. That is, when the tilt angle θa (θb) is about 40° to 50°, the directivity angular distribution of light output from the light-guiding body 71 is suppressed in a narrower range. Thereby, the tilt angle θa of the first inclined face 74a and the tilt angle θb of the second inclined face 74b are preferably, for example, about 40° to 50°.

Figure 15A:
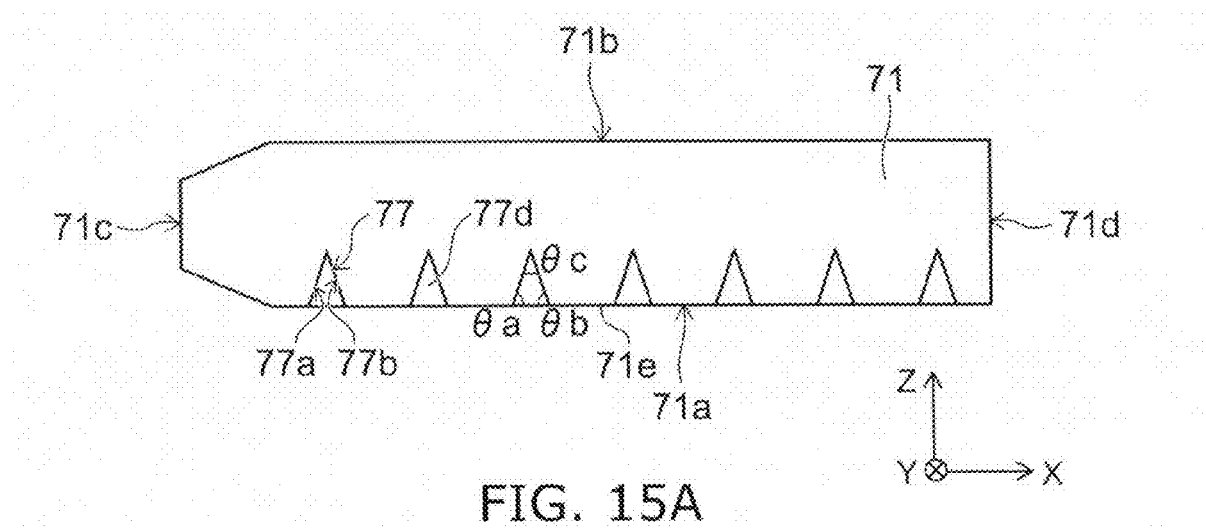
FIGS. 15A and 15B are schematic views illustrating a light-guiding body of another display device according to the first embodiment.
Figure 15B:
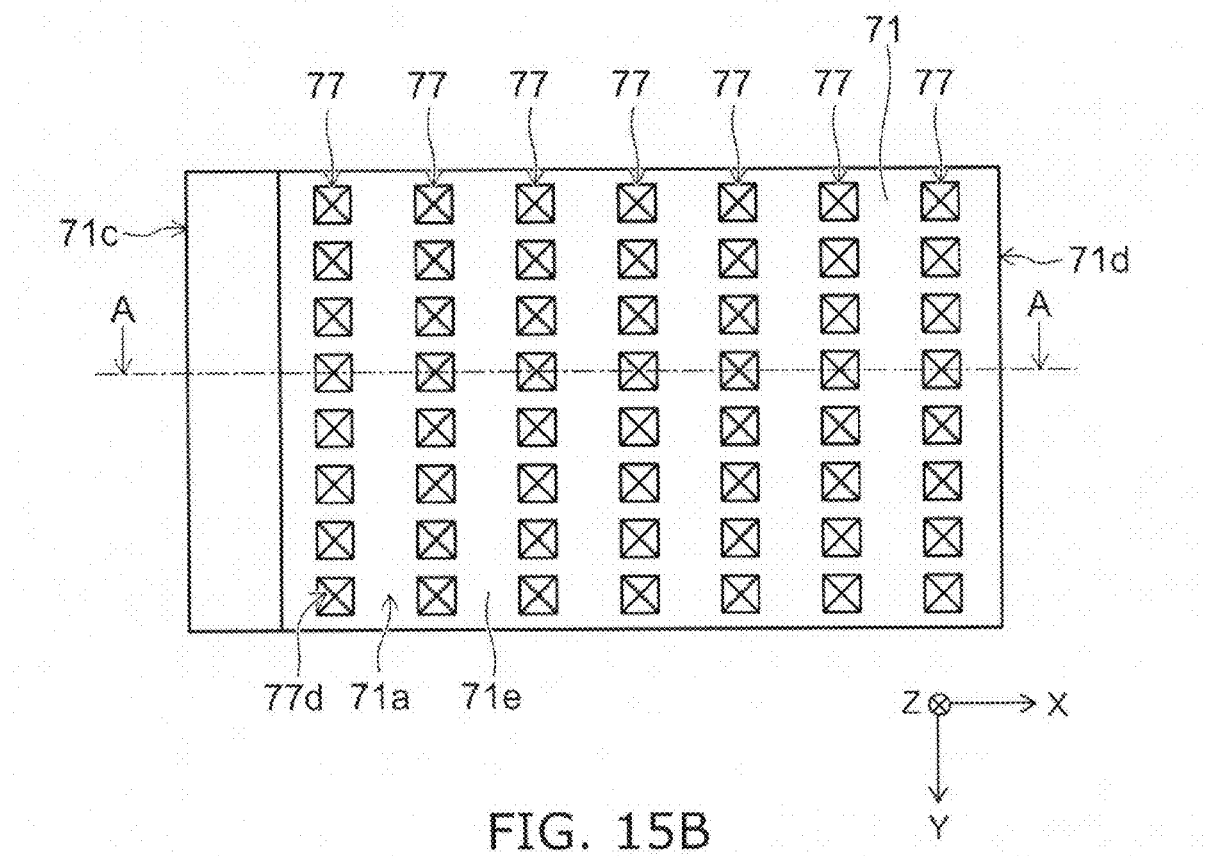

FIGS. 15A and 15B are schematic views illustrating a light-guiding body of another display device according to the first embodiment.

Also, FIG. 15A is the schematic cross-sectional view taken along the line A-A shown in FIG. 15B. FIG. 15B is a schematic plan view when viewed perpendicular to the first major surface 71a of the light-guiding body 71.

A concave portion 77d shown in FIGS. 15A and 15B has the form of a four-sided pyramid groove. As shown in FIG. 15A, the first major surface 71a of the light-guiding body 71 has a plurality of the concave portions 77d having a first inclined face 77a and a second inclined face 77b inclined relative to the first major surface 71a, and the flat portions 71e in which the plurality of the concave portions 77d are not provided. The first inclined face 77a and the second inclined face 77b are not perpendicular to the first side face 71c on which the light source 73 is disposed.

For example, a cross-section when the structure 77 is viewed in the longitudinal direction has the form of an isosceles triangle in which the apex angle θc is about 96°. That is, the tilt angle θa of the first inclined face 77a and the tilt angle θb of the second inclined face 77b are about 42°. The area ratio of the structures 77 is, for example, about 8 to 25%. The area ratio of the structures 77 is more preferably, for example, about 15%. The structures 77 are evenly provided over the entire first major surface 71a of the light-guiding body 71. Therefore, the area ratio of the structures 77 is even over the entire first major surface 71a.

The structures 77 change the direction of travel of light propagating thorough the light-guiding body 71, and causes the light to enter the wavelength selection transmission layer 20 at a small angle of incidence. Therefore, as described above in relation to FIGS. 3 to 5, light that does not pass through a specific region of the wavelength selection transmission layer 20 returns to the illumination unit 70. Then, the light is reflected at the reflection films 72 in a state where the frequency at which the light impinges on the structures 77 is reduced. Therefore, the light is reused. Because of this, it is possible to obtain a high light utilization efficiency. Thereby, it is possible to obtain a display in which the color is beautiful, the display is bright, and the contrast is favorable. In addition, it is possible to reduce power consumption.

Figure 16A:
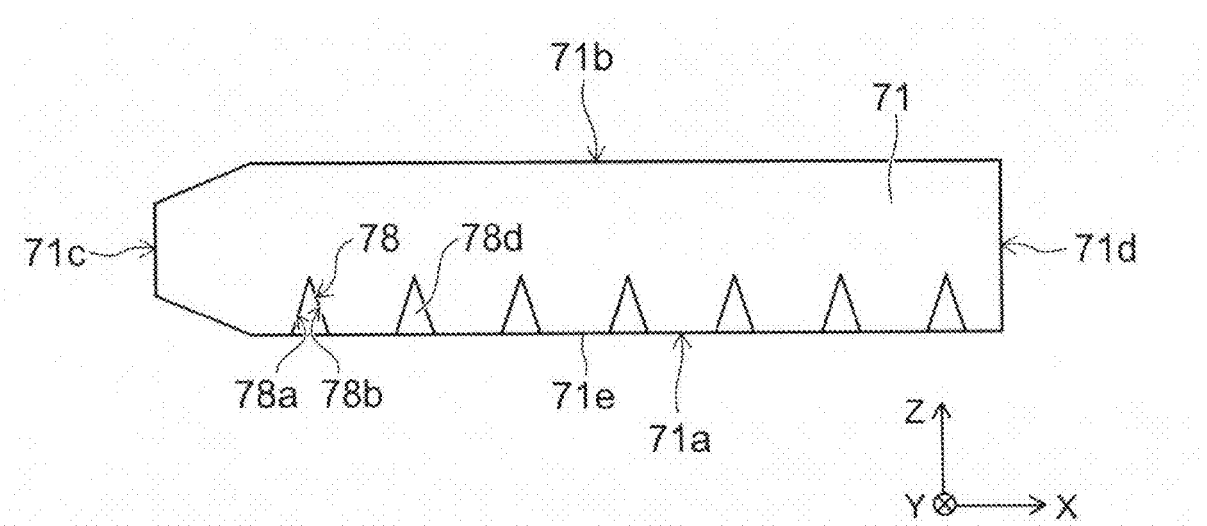
FIGS. 16A and 16B are schematic views illustrating a light-guiding body of a further display device according to the first embodiment.
Figure 16B:
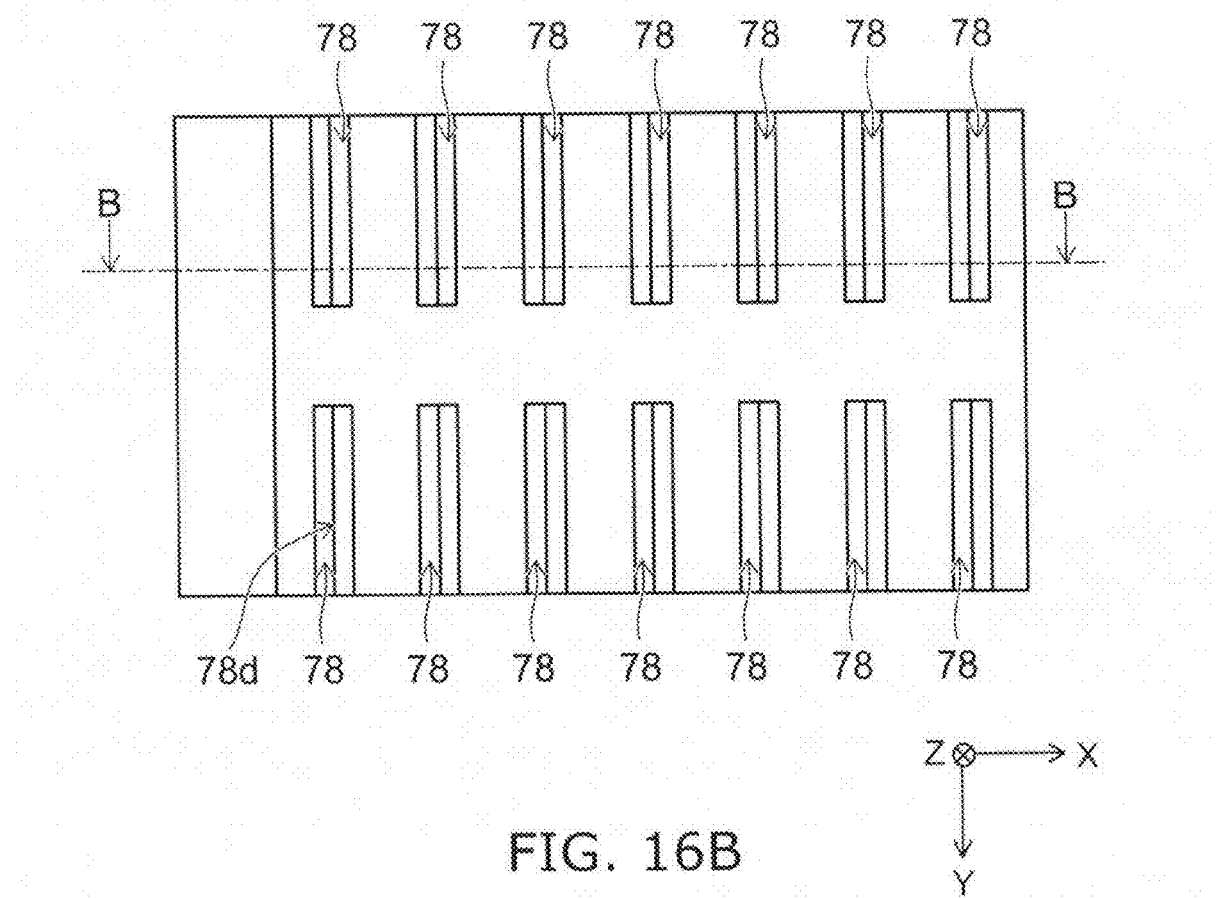

FIGS. 16A and 16B are schematic views illustrating a light-guiding body of a further display device according to the first embodiment.

Also, FIG. 16A is a schematic cross-sectional view taken along the line B-B shown in FIG. 16B. FIG. 16B is a schematic plan view when viewed perpendicular to the first major surface 71a of the light-guiding body 71.

That is, a concave portion 78d shown in FIGS. 16A and 16B has the form of a so-called V-shaped groove. A structure 78 extends approximately in parallel with the first side face 71c on which the light source 73 is disposed. As shown in FIG. 16B, as in the structure 74 described above in relation to FIGS. 1 and 2, the structure 78 does not extend from one side face of the light-guiding body 71 to the other side face facing the one side face. The structure 78 extends from the one side face of the light-guiding body 71 to approximately the central part of the light-guiding body 71. That is, a plurality of structures 78 are approximately linearly provided along the longitudinal direction (extending direction) of the structures 78. In the light-guiding body 71 shown in FIGS. 16A and 16B, the number of the structures 78 approximately linearly provided along the longitudinal direction of the structures 78 is two. However, the number of the structures 78 is not limited to this, and may be not less than three.

As shown in FIG. 16A, the first major surface 71a of the light-guiding body 71 has a plurality of the concave portions 78d having a first inclined face 78a and a second inclined face 78b inclined relative to the first major surface 71a, and the flat portions 71e in which the plurality of the concave portions 78d are not provided. The first inclined face 78a and the second inclined face 78b are not perpendicular to the first side face 71c on which the light source 73 is disposed. The area ratio of the structures 78 is, for example, about 8 to 25%. The area ratio of the structures 78 is more preferably, for example, about 15%. The structures 78 are evenly provided over the entire first major surface 71a of the light-guiding body 71. Therefore, the area ratio of the structures 78 is even over the entire first major surface 71a.

The structures 78 change the direction of travel of light propagating thorough the light-guiding body 71, and causes the light to enter the wavelength selection transmission layer 20 at a small angle of incidence. At this time, the area ratio of the structures 78 is, for example, about 8 to 25%. Therefore, an advantage similar to the advantage described above in relation to FIGS. 15A and 15B is obtained.

(Second Embodiment)

A backlight for a display device according to a second embodiment will now be described with reference to the drawings.

Figure 17:
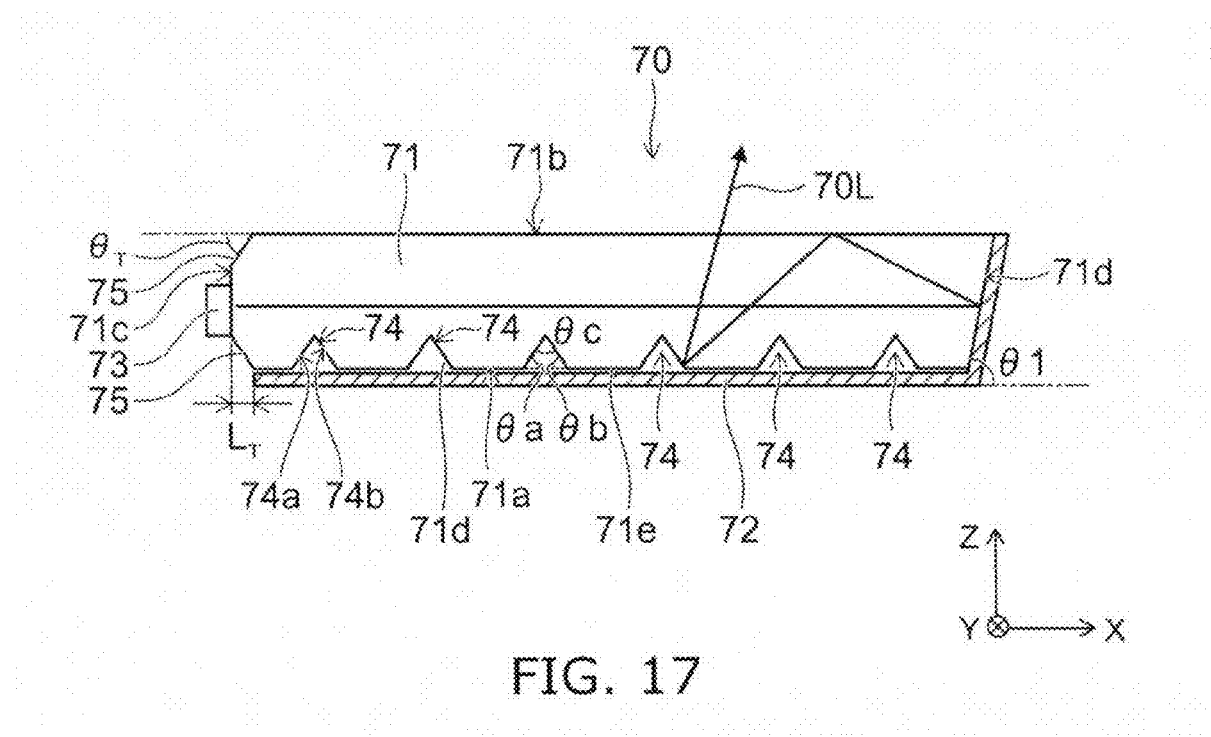
FIG. 17 is a schematic cross-sectional view illustrating a configuration of the backlight for a display device according to the second embodiment.

FIG. 17 is a schematic cross-sectional view illustrating a configuration of the backlight for a display device according to the second embodiment.

As shown in FIG. 17, the illumination unit (backlight for a display device) 70 according to the embodiment includes the light-guiding body 71, the reflection film 72, and the light source 73. The reflection film 72 and the light source 73 respectively are similar to the reflection film 72 and the light source 73 described above in relation to FIGS. 1 and 2.

The light-guiding body 71 has the first major surface 71a, the second major surface 71b opposite to the first major surface 71a, the first side face 71c, and the second side face 71d opposite to the first side face 71c. The first major surface 71a is parallel to the second major surface 71b. The structures 74 are formed in the first major surface 71a of the light-guiding body 71. The structures 74 have, for example, a function of changing the direction of light travel. The structures 74 reflect, for example, light and change the direction of light travel. The structures 74 extend approximately in parallel with the first side face 71c on which the light source 73 is disposed (see FIG. 2). A structure having a concave-convex shape, such as a groove, for example, is used as the structure 74. In the illumination unit 70 shown in FIG. 17, the concave portion 74d having the first inclined face 74a and the second inclined face 74b is used as the structure 74.

That is, as shown in FIG. 17, the first major surface 71a of the light-guiding body 71 has a plurality of the concave portions 74d having the first inclined face 74a and the second inclined face 74b inclined relative to the first major surface 71a, and the flat portions 71e in which the plurality of the concave portions 74d are not provided.

Specifically, the concave portion 74d has the form of a V-shaped groove. The area ratio of the structures 74 is preferably, for example, about 8 to 25%. The area ratio of the structures 74 is more preferably, for example, about 15%. The structures 74 are evenly provided over the entire first major surface 71a of the light-guiding body 71. Therefore, the area ratio of the structures 74 is even over the entire first major surface 71a.

The first inclined face 74a and the second inclined face 74b are not perpendicular to the first side face 71c on which the light source 73 is disposed. In other words, when viewed perpendicular to the first major surface 71a of the light-guiding body 71, a normal to the first inclined face 74a and a normal to the second inclined face 74b are parallel to a normal to the first side face 71c. That is, the first inclined face 74a and the second inclined face 74b each have a side approximately parallel to the first side face 71c.

Light generated in the light source 73 enters the inside of the light-guiding body 71 from the first side face 71c. While light entering the inside of the light-guiding body 71 is, for example, totally reflected at the interface between the light-guiding body 71 and air, the light propagates through the light-guiding body 71. Alternatively, while light entering the inside of the light-guiding body 71 is reflected at the reflection film 72, the light propagates through the light-guiding body 71.

The structures 74 change the direction of travel of light propagating thorough the light-guiding body 71, and the light is output to the outside of the light-guiding body 71. At this time, in a case where the area ratio Ras of the structures 74 is, for example, 8 to 25%, when the illumination unit 70 according to the embodiment is used as a backlight of a display device having an interference type color filter, it is possible to enhance the light extraction amount of light output from the light-guiding body 71. That is, it is possible to enhance the utilization efficiency of light.

For example, a cross-section when the structure 74 is viewed in the longitudinal direction may have the form of an isosceles triangle in which the apex angle θc is about 96°. That is, the tilt angle θa of the first inclined face 74a and the tilt angle θb of the second inclined face 74b may be about 42°. In this case, the angle of light output from the light-guiding body 71 can be made smaller.

In addition, in the light-guiding body 71 shown in FIG. 17, the tapered portion 75 inclined relative to the first major surface 71a and the first side face 71c is formed. In addition, the tapered portion 75 inclined relative to the second major surface 71b and the first side face 71c is formed. The tilt angle θT of the tapered portion 75 is about 10°. The length LT of the tapered portion 75 is about 3 mm to 4 mm.

When the tilt angle θT of the tapered portion 75 is 10°, if light traveling the inside of the light-guiding body 71 is once totally reflected at the tapered portion 75, the directivity angle in the thickness direction of the light-guiding body 71 is shifted by 20° from the travel direction before total reflection toward the reverse direction. Therefore, if the length LT of the tapered portion 75 is set so that the entire light entering the light-guiding body 71 from the light source 73 is totally reflected at the tapered portion 75 at least once, it is possible to suppress, at not more than about 20°, the directivity angular distribution in the thickness direction of the light-guiding body 71.

In this way, if the structure 74 is irradiated with light in which the directivity angular distribution in the thickness direction of the light-guiding body 71 is suppressed at not more than about 20°, when the tilt angle θa of the first inclined face 74a and the tilt angle θb of the second inclined face 74b of the concave portion 74d having the form of a V-shaped groove is about 40° to 50°, it is possible to suppress, at not more than 40°, the light not less than 70% of the light output from the light-guiding body 71.

In addition, as shown in FIG. 17, the second side face 71d of the light-guiding body 71 is not perpendicular to but inclined relative to the first major surface 71a. The tilt angle θ1 of the second side face 71d relative to a line extended from the first major surface 71a is, for example, about 80°. In this case, if light traveling, in the horizontal direction (the direction parallel to the first major surface 71a), the inside of the light-guiding body 71 is once reflected at the reflection film 72 disposed on the second side face 71d, the directivity angle in the thickness direction of the light-guiding body 71 is shifted by 20° from the travel direction before total reflection toward the reverse direction (θ2=20°). Then, light which is, for example, totally reflected at the interface between the light-guiding body 71 and air, and whose travel direction is changed by the structure 74 is output from the light-guiding body 71 to the outside, as the illumination light 70 L.

The second side face 71d of the light-guiding body 71 may be perpendicular to the first major surface 71a (see FIG. 1).

Although an example in which a liquid crystal layer used as the light control layer 50 have been described above, the configuration of the light control layer 50 is optional in the embodiments. It is possible to use a mechanical shutter, or the like in which, for example, MEMS (Micro Electro Mechanical Systems) are used, as the light control layer 50.

Hereinabove, exemplary embodiments of the invention are described with reference to specific examples. However, the invention is not limited to these specific examples. For example, one skilled in the art may similarly practice the invention by appropriately selecting specific configurations of components included in display devices such as first substrate, second substrates, wavelength selection transmission layers, switching elements, light control layers, wavelength selection absorption layers, and illumination units from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all display devices and backlights for display devices practicable by an appropriate design modification by one skilled in the art based on the display devices and the backlights for display devices described above as embodiments of the invention also are within the scope of the invention to the extent that the purport of the embodiments of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
   a light-guiding body having a first major surface, a second major surface opposite to the first major surface, and a side face connecting the first major surface and the second major surface;
   a light source causing light to enter an inside of the light-guiding body from the side face;
   a wavelength selection transmission layer provided on the second major surface, the wavelength selection transmission layer having:
      a first region transmitting light of a first wavelength band, of visible light and reflecting light of a wavelength band excluding the first wavelength band; and
      a second region transmitting light of a second wavelength band different from the first wavelength band, of the visible light and reflecting light of a wavelength band excluding the second wavelength band; and
   a light control layer provided on the wavelength selection transmission layer and changing an intensity of light passing through the light control layer,
   the first major surface having a plurality of concave portions having inclined faces inclined relative to the first major surface,
   a ratio of a total area of areas of the plurality of the concave portions projected on the first major surface, relative to a total area of the first major surface, being 8% to 25%, and
   the plurality of the concave portions being evenly provided in the first major surface.

2. The device according to claim 1, wherein the inclined faces are provided non-perpendicular to the side face and each have a side parallel to the side face.

3. The device according to claim 1, wherein
   the wavelength selection transmission layer has a structure in which a plurality of dielectric films having respective different refractive indexes are stacked, and
   a major surface of at least any of the plurality of dielectric films is parallel to the first major surface of the light-guiding body.

4. The device according to claim 1, wherein angles of the inclined faces relative to the first major surface are 40° to 50°.

5. The device according to claim 1, wherein the concave portion has a form of a V-shaped groove.

6. The device according to claim 5, wherein the V-shaped groove is provided so as to extend from a first end part of the light-guiding body to a second end part facing the first end part.

7. The device according to claim 5, wherein
   the V-shaped groove has:
      a first V-shaped groove extending from a first end part of the light-guiding body to a central part of the light-guiding body; and
      a second V-shaped groove extending from a second end part facing the first end part to the central part of the light-guiding body, and
   the first V-shaped groove and the second V-shaped groove are linearly provided along a extending direction.

8. The device according to claim 1, wherein the concave portion has a form of a four-sided pyramid groove.

9. The device according to claim 1, wherein the light-guiding body has at least any of:
   a first tapered portion inclined relative to the first major surface and the side face; and
   a second tapered portion inclined relative to the second major surface and the side face.

10. The device according to claim 9, wherein a length of the first tapered portion in a direction parallel to at least any of the first major surface and the second major surface is 4 to 5 millimeters.

11. The device according to claim 9, wherein a length of the second tapered portion in a direction parallel to at least any of the first major surface and the second major surface is 4 to 5 millimeters.

12. The device according to claim 1, further comprising a wavelength selection absorption layer provided on the light control layer, the wavelength selection absorption layer including:
   a first absorption layer having a portion overlapping with the first region, when viewed along a direction perpendicular to the first major surface; and
   a second absorption layer having a portion overlapping with the second region, when viewed along the direction perpendicular to the first major surface, and having an absorption spectrum different from an absorption spectrum of the first absorption layer.

13. A backlight for a display device, comprising:
   a light-guiding body having a first major surface, a second major surface opposite to the first major surface, and a first side face connected to the first major surface and the second major surface; and
   a light source causing light to enter an inside of the light-guiding body from the first side face,
   the first major surface having a plurality of concave portions having inclined faces inclined relative to the first major surface,
   a ratio of a total area of areas of the plurality of the concave portions projected on the first major surface, relative to a total area of the first major surface, being 8% to 25%, and the plurality of the concave portions being evenly provided in the first major surface.

14. The backlight according to claim 13, wherein the inclined faces are provided non-perpendicular to the first side face and each have a side parallel to the first side face.

15. The backlight according to claim 13, wherein angles of the inclined faces relative to the first major surface are 40° to 50°.

16. The backlight according to claim 13, wherein the concave portion has a form of a V-shaped groove.

17. The backlight according to claim 13, wherein the light-guiding body has at least any of:
   a first tapered portion inclined relative to the first major surface and the first side face; and
   a second tapered portion inclined relative to the second major surface and the first side face.

18. The backlight according to claim 17, wherein a length of the first tapered portion in a direction parallel to at least any of the first major surface and the second major surface is 3 to 4 millimeters.

19. The backlight according to claim 17, wherein a length of the second tapered portion in a direction parallel to at least any of the first major surface and the second major surface is 3 to 4 millimeters.

20. The backlight according to claim 13, wherein
   the light-guiding body further has a second side face opposite to the first side face and connected to the first major surface and the second major surface, and
   the second side face is inclined relative to the first major surface.

21. The device according to claim 1, wherein the first major surface is parallel to the second major surface and includes:
   the plurality of concave portions respectively having a first inclined face and a second inclined face inclined relative to the first major surface; and
   a plurality of flat portions in which the plurality of the concave portions are not provided.

* * * * *